US010039010B2

(12) United States Patent
Futaki

(10) Patent No.: US 10,039,010 B2
(45) Date of Patent: Jul. 31, 2018

(54) BASE STATION, MACHINE-TO-MACHINE (M2M) TERMINAL, METHOD, AND COMPUTER READABLE MEDIUM

(71) Applicant: NEC Corporation, Tokyo (JP)

(72) Inventor: Hisashi Futaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/583,701

(22) Filed: May 1, 2017

(65) Prior Publication Data

US 2017/0238193 A1 Aug. 17, 2017

Related U.S. Application Data

(63) Continuation of application No. 15/112,697, filed as application No. PCT/JP2014/004549 on Sep. 4, 2014.

(30) Foreign Application Priority Data

Jan. 30, 2014 (JP) .................................. 2014-015868

(51) Int. Cl.
*H04W 16/26* (2009.01)
*H04W 4/00* (2018.01)
(Continued)

(52) U.S. Cl.
CPC ........... *H04W 16/26* (2013.01); *H04W 4/005* (2013.01); *H04W 8/22* (2013.01); *H04W 68/005* (2013.01); *H04W 92/10* (2013.01)

(58) Field of Classification Search
CPC ....... H04W 4/005; H04W 4/006; H04W 8/22; H04W 8/24; H04W 8/245; H04W 16/26; H04W 68/005; H04W 92/10
See application file for complete search history.

(56) References Cited

U.S. PATENT DOCUMENTS

2013/0150106 A1 6/2013 Bucknell et al.
2013/0273878 A1 10/2013 Heo et al.
2016/0205659 A1* 7/2016 Bergman ............. H04L 1/1812
370/252

FOREIGN PATENT DOCUMENTS

EP 2603030 A1 6/2013
JP 2013-123222 A 6/2013
(Continued)

OTHER PUBLICATIONS

International Search Report corresponding to PCT/JP2014/004549, dated Nov. 11, 2014, 1 page.
(Continued)

*Primary Examiner* — Khoa Huynh
(74) *Attorney, Agent, or Firm* — Wilmer Cutler Pickering Hale and Dorr LLP

(57) ABSTRACT

A base station (13) is configured to receive, from a Machine-to-machine (M2M) terminal (11) or a core network (14), history information indicating whether or not specific coverage enhancement processing was executed in previous communication with the M2M terminal (11). Further, the base station (13) is configured to control communication using the specific coverage enhancement processing between the M2M terminal (11) and the base station (13) based on the history information received from the M2M terminal (11) or the core network (14). It is thus possible to contribute to improving efficiency of determination regarding whether to apply a special coverage enhancement processing to the M2M terminal.

10 Claims, 8 Drawing Sheets

(51) Int. Cl.
H04W 8/22      (2009.01)
H04W 68/00     (2009.01)
H04W 92/10     (2009.01)

(56)            References Cited

FOREIGN PATENT DOCUMENTS

WO    WO-2008/087524 A2    7/2008
WO    WO-2012/045369 A1    4/2012

OTHER PUBLICATIONS

Vodafone Group "Guidance on delay tolerance level of MTC applications", 3GPP TSG-RAN WG1#75 R1-135802, Nov. 11, 2013, (pp. 1-2).
Vodafone Group "Acquisition of network originated data by MTC UEs in enchanced coverage mode", 3GPP TSG-RAN WG2#85 R2-140629, Jan. 31, 2014, (4 pages).
3GPP TR 37.868 V11.0.0 (Sep. 2011), "3rd Generation Partnership Project; Technical Specification Group Radio Access Network; Study on RAN Improvements for Machine-type Communications; (Release 11)" Sep. 2011, (pp. 1-28).
3GPP TR 36.888 V12.0.0 (Jun. 2013), "3rd Generation Partnership Project; Technical Specification Group Radio Access Network; Study on provision of low-cost Machine-Type Communications (MTC) User Equipments (UEs) based on LTE (Release 12)" Jun. 2013, (pp. 1-55).
3GPP R1-135943, Vodafone, "Way Forward on P-BCH for MTC enhanced coverage", 3GPP TSG RAN WG1 #75, Nov. 11-15, 2013, (2 pages).
3GPP R1-135944, Vodafone, "Way Forward on PRACH for MTC enhanced coverage", 3GPP TSG RAN WG1 #75, Nov. 11-15, 2013, (4 pages).
3GPP R1-136001, Vodafone et al. "Way forward on PDCCH, PDSCH, PUCCH and PUSCH for MTC enhanced coverage", 3GPP TSG RAN WG1 #75, Nov. 11-15, 2013, (2 pages).
U.S. Office Action issued by the U.S. Patent and Trademark Office for U.S. Appl. No. 15/112,697 dated Jun. 30, 2017 (17 pages).
NTT Docomo "Discussion on Multi-level PRACH Coverage Enhancement", 3GPP TSG RAN WG1 Meeting #75, R1-135509, XP050735182, San Francisco, USA, Nov. 11-15, 2013, pp. 1-7 (7 pages).
Catt "Analysis of Coverage Improvement for Low-cost MTC LTE UEs", 3GPP TSG RAN WG1 Meeting #71, R1-125247, XP050663126, New Orleans, USA, Nov. 12-16, 2012, pp. 1-7 (7 pages).
Extended European Search Report issued in European Patent Application No. 14880670.6, dated Sep. 12, 2017, 11 pages.
Catt, "Impact Analysis of Extended Coverage," 3GPP TSG RAN WG2 Meeting #85, R2-140073, Agenda Item 7.9.2, Prague, Czech, Feb. 10-14, 2014 (6 pages).
Korean Office Action issued by the Korean Intellectual Property Office for Korean Application No. 10-2017-7014846 dated Feb. 21, 2018 (3 pages).
Ericsson, "Control of amount of coverage enchancement for MTC UE," 3GPP TSG RAN WG1 Meeting #74bis, R1-134648, Agenda Item 7.2.2.2.2, Guangzhou, China, Oct. 7-11, 2013 (4 pages).
Japanese Office Action issued by the Japan Patent Office for Japanese Application No. 2015-559621 dated Jun. 12, 2018 (6 pages).

* cited by examiner

BASE STATION, MACHINE-TO-MACHINE (M2M) TERMINAL, METHOD, AND COMPUTER READABLE MEDIUM

CROSS-REFERENCE TO RELATED APPLICATIONS

This application is a continuation of U.S. patent application Ser. No. 15/112,697 filed on Jul. 20, 2016 which is a prior national stage application of International Application No. PCT/JP2014/004549 entitled "BASE STATION, MACHINE-TO-MACHINE (M2M) TERMINAL, METHOD, AND COMPUTER READABLE MEDIUM," filed on Sep. 4, 2014, which claims the benefit of the priority of Japanese Patent Application No. 2014-015868 filed on Jan. 30, 2014, the disclosures of each of which are hereby incorporated by reference in their entirety.

TECHNICAL FIELD

The present disclosure relates to a radio communication system which performs a communication control in order to enhance coverage.

BACKGROUND ART

In the 3rd Generation Partnership Project (3GPP) Long Term Evolution (LTE), standardization of techniques for improving deterioration of communication quality due to recent sharp increase in mobile traffic and for achieving faster communication has been performed. Further, standardization of techniques for avoiding increase in a control signaling load due to connections of an enormous number of Machine to Machine (M2M) terminals to an LTE network has been performed (Non-Patent Literature 1). The M2M terminals are, for example, terminals that perform communication without human intervention. The M2M terminals are placed in various types of equipment including machines (e.g., vending machines, gas meters, electric meters, vehicles, railway vehicles, and ships) and sensors (e.g., environmental, agricultural, and traffic sensors). In the LTE, communication performed by the M2M terminals are referred to as Machine Type Communications (MTC) and a terminal performing the MTC is referred to as an MTC terminal (MTC User Equipment (MTC UE)).

While M2M service providers need to distribute an enormous number of M2M terminals, there is a limit to the cost allowable for each M2M terminal. Therefore, it is required M2M terminals be implemented at a low cost, and M2M terminals be able to perform communication with low power consumption, for example. Further, in one use case, MTC UEs perform communication while they are fixedly or statically installed in buildings. In this case, the radio quality of MTC UEs may be always low and accordingly coverage enhancement technique is especially needed for MTC devices compared to normal UEs having mobility (e.g., mobile telephones, smartphones, tablet computers, and notebook personal computers (notebook PCs)). Further, functional restrictions contributing to reduction of the cost include, for example, a low maximum transmission power, a small number of reception antennas, no support of high-order modulation schemes (e.g., 64 Quadrature Amplitude Modulation (64QAM)), and a narrow operating bandwidth (e.g., 1.25 MHz), which lower the maximum transmission rate of MTC UEs. Therefore, in the LTE, standardization of techniques for enhancing communication characteristics of MTC UEs (i.e., coverage), which are expected to be lower than those of normal UE has been performed (Non-Patent Literature 2). In the following description, some examples of the techniques for enhancing coverage of MTC UEs discussed in the LTE are described. It can be said that the coverage enhancement techniques (coverage enhancement processing) for MTC UEs described below are processing for enhancing or improving communication characteristics or communication quality of MTC UEs. The state of a UE to which these special coverage enhancement techniques has been applied is referred to as a coverage enhancement mode (Enhanced Coverage Mode (ECM)).

The ECM can improve, for example, a reception characteristic of a Physical Broadcast Channel (PBCH), a transmission characteristic of a Physical Random Access Channel (PRACH) preamble (i.e., detection characteristic in an eNB), a reception characteristic of a Physical Downlink Shared Channel (PDSCH), and a transmission characteristic of a Physical Uplink Shared Channel (PUSCH). The PBCH is a downlink broadcast channel used by an eNB to transmit broadcast information commonly used within a cell. The PRACH is an uplink physical channel used by a UE for an initial access to a radio base station (eNB). The PDSCH is a downlink physical channel used for data reception by a UE. The PUSCH is an uplink physical channel used for data transmission by a UE.

One processing that is being discussed to improve a reception characteristic of the PBCH is to repeatedly transmit broadcast information on the PBCH a number of extra times as compared to the normal operation by a predetermined number of times (Non-Patent Literature 3). One processing that is being discussed to improve a transmission characteristic of the PRACH is to repeatedly transmit the PRACH (i.e., preamble) a predetermined number of times (Non-Patent Literature 4). Further, one processing that is being discussed to improve a reception characteristic of the PDSCH and a transmission characteristic of the PUSCH is to repeatedly transmit the PDSCH and the PUSCH over multiple subframes (Non-Patent Literature 5). According to the above processing, communication characteristics of MTC UEs that is expected to be lower than that of normal UEs will be improved.

It is assumed that the coverage enhancement processing in the ECM is executed by MTC UEs that perform a delay tolerant access. The delay tolerant access is defined as being a new EstablishmentCause that is specified in an RRC Connection Request message and is used, for example, to control an overload. The delay tolerant access is mainly intended for MTC UEs that execute a delay-tolerant MTC application. For example, in a metering service (meter reading service), there is no need to send a metering report to a remote system in real time (or in exact communication cycles) and a long delay may be allowed for the transmission of the metering report. When an eNB imposes overload control on the delay tolerant access, the eNB may reject an RRC Connection Request transmitted by a RRC Connection Request message that contains "EstablishmentCause" indicating the delay tolerant access.

CITATION LIST

Non Patent Literature

[Non-Patent Literature 1] 3GPP TR 37.868 V11.0.0 (2011-09), "3rd Generation Partnership Project; Technical Specification Group Radio Access Network; Study on RAN Improvements for Machine-type Communications; (Release 11)", September, 2011

[Non-Patent Literature 2] 3GPP TR 36.888 V12.0.0 (2013-06), "3rd Generation Partnership Project; Technical Specification Group Radio Access Network; Study on provision of low-cost Machine-Type Communications (MTC) User Equipments (UEs) based on LTE (Release 12)", June, 2013

[Non-Patent Literature 3] 3GPP R1-135943, Vodafone, "Way Forward on P-BCH for MTC enhanced coverage", 3GPP TSG RAN WG1 #75, San Francisco, USA, 11-15 Nov. 2013

[Non-Patent Literature 4] 3GPP R1-135944, Vodafone, "Way Forward on PRACH for MTC enhanced coverage", 3GPP TSG RAN WG1 #75, San Francisco, USA, 11-15 Nov. 2013

[Non-Patent Literature 5] 3GPP R1-136001, Vodafone et al. "Way forward on PDCCH, PDSCH, PUCCH and PUSCH for MTC enhanced coverage", 3GPP TSG RAN WG1 #75, San Francisco, USA, 11-15 Nov. 2013

SUMMARY OF INVENTION

Technical Problem

The present inventor has examined many problems that are caused when the coverage enhancement processing in the ECM is applied to MTC UEs (M2M terminals). For example, while PBCH repetition is commonly applied to MTC UEs in a cell, RACH repetition and PDSCH/PUSCH repetition are separately applied to each MTC UE.

In the coverage enhancement processing separately applied to each MTC UE (e.g., RACH repetition and PDSCH/PUSCH repetition), a large number of radio resources are consumed as the number of MTC UEs performing the ECM increases, which may cause decrease in radio resources that can be used by normal UEs, which are not MTC UEs. Furthermore, if the processing separately applied to each MTC UE (e.g., PDSCH/PUSCH repetition) is applied to an MTC UE which has a high radio quality, power consumption of this MTC UE may be unnecessarily increased. Accordingly, it may be required to select MTC UEs that should execute the ECM based on radio quality of these MTC UEs (e.g., Reference Signal Received Power (RSRP), Reference Signal Received Quality (RSRQ), or Channel Quality Indicator (CQI)). For example, it may be possible to select MTC UEs that has low radio quality and selectively cause them to execute the ECM (i.e., the coverage enhancement processing in the ECM).

However, the processing for selecting an MTC UE that should execute the ECM may require some time (e.g., hundreds of ms), which may increase, for example, a time required for completion of a procedure for establishing a radio connection (e.g., RRC Connection Establishment Procedure). Furthermore, according to the normal procedure in the LTE, when an MTC UE has finished its communication and returns to an idle state (RRC_IDLE) from a connected state (RRC_CONNECTED), an eNB releases (deletes) a context that has been held by the eNB regarding the MTC UE. Accordingly, the eNB may need to repeatedly determine the necessity of the ECM when an MTC UE transitions to the connected state (RRC_CONNECTED) from the idle state (RRC_IDLE) to perform communication.

The terms "idle state" and "connected state" used in the specification is defined as follows. The "idle state" is a state in which a radio connection between a UE and an eNB has been released. Accordingly, the eNB has no information (UE context) regarding the UE in the idle state. The location of the UE in the idle state is tracked by a core network at location-registration-area level (e.g., tracking area or routing area). The core network can reach the UE in the idle state by paging. Further, the UE in the idle state cannot perform unicast data transmission to or from the eNB. Accordingly, the UE in the idle state should transition to the connected state in order to perform unicast data transmission. Examples of the idle state include: (1) an RRC idle state in a Universal Terrestrial Radio Access Network (UTRAN); (2) an RRC_IDLE state in an Evolved UTRAN (E-UTRAN); and (3) an Idle state in WiMAX (IEEE 802.16-2004), mobile WiMAX (IEEE 802.16e-2005), and WiMAX2 (IEEE 802.16m).

On the other hand, the connected state is a state in which the UE is connected to the eNB. Accordingly, the eNB has information (UE context) regarding the UE in the connected state. The location of the UE in the connected state is tracked by the core network at cell level or base-station level. In most cases, the UE in the connected state can perform unicast data transmission to and from the eNB. However, when the UE is in a CELL_PCH state and a URA_PCH state in the UTRAN, the UE context is held by a base station (NodeB), but no dedicated channel is allocated to the UE either in uplink or in downlink. Examples of the connected state include: (1) an RRC connected state in the UTRAN; (2) an RRC_CONNECTED state in the E-UTRAN; and (3) a connected state in the WiMAX, the mobile WiMAX, and the WiMAX2. Note that, the RRC connected state in the UTRAN includes a CELL_DCH state, a CELL_FACH state, a CELL_PCH state, and a URA_PCH state.

In view of the above, one object of embodiments disclosed in the specification is to provide a base station, an M2M terminal (MTC UE), a method, and a program contributing to improving efficiency of determination regarding whether to apply the ECM (i.e., the coverage enhancement processing in the ECM) to the MTC UE (M2M terminal). It should be noted that this object is merely one of objects accomplished by the embodiments disclosed in the specification. The other objects or problems and novel features will be made apparent from the specification or the accompanying drawings.

Solution to Problem

In one aspect, a base station apparatus includes a radio communication unit and a controller. The controller is configured to receive, from a Machine-to-machine (M2M) terminal or a core network, history information indicating whether or not specific coverage enhancement processing was executed in previous communication with the M2M terminal and to control communication using the specific coverage enhancement processing between the M2M terminal and the radio communication unit based on the history information.

In one aspect, a core network apparatus that is included in a core network includes an interface and a controller. The interface is configured to transmit and receive signaling messages to and from a base station. The controller is configured to send, to the base station via the interface during a procedure for establishing a bearer between a Machine-to-machine (M2M) terminal and the core network, history information indicating whether or not specific coverage enhancement processing was executed in previous communication with the M2M terminal.

In one aspect, an M2M terminal includes a radio communication unit and a controller. The radio communication unit is configured to communicate with a base station. The controller is configured to transmit, to the base station via the radio communication means when establishing a radio connection with a base station or while a procedure for establishing a bearer between the M2M terminal and a core network via the base station is being performed, history information indicating whether or not specific coverage enhancement processing was executed in previous communication of the M2M terminal.

In one aspect, a method performed by a base station includes (a) receiving, from a Machine-to-machine (M2M) terminal or a core network, history information indicating whether or not specific coverage enhancement processing was executed in previous communication with the M2M terminal, and (b) controlling communication using the specific coverage enhancement processing between the M2M terminal and the base station based on the history information.

In one aspect, a method performed by a core network apparatus that is included in a core network includes sending, to a base station during a procedure for establishing a bearer between a Machine-to-machine (M2M) terminal and the core network, history information indicating whether or not specific coverage enhancement processing was executed in previous communication with the M2M terminal.

In one aspect, a method performed by an M2M terminal includes transmitting, to a base station when establishing a radio connection with a base station or while a procedure for establishing a bearer between the M2M terminal and a core network via the base station is being performed, history information indicating whether or not specific coverage enhancement processing was executed in previous communication of the M2M terminal.

In one aspect, a program contains a set of instructions (software codes) which, when loaded into a computer, causes the computer to perform any one of the aforementioned methods.

Advantageous Effects of Invention

According to the above aspects, it is possible to provide a base station, an M2M terminal (MTC UE), a method, and a program contributing to improving efficiency of determination regarding whether to apply the ECM (i.e., the coverage enhancement processing in the ECM) to the MTC UE (M2M terminal). It should be noted that this effect is merely one of effects expected to be brought about by the embodiments disclosed in the specification.

DESCRIPTION OF EMBODIMENTS

Hereinafter, specific embodiments will be described in detail with reference to the drawings. The same or corresponding components are denoted by the same reference symbols throughout the drawings, and repetitive explanations will be omitted as necessary for the sake of clarity.

Each of embodiments described below may be implemented independently or in combination with any other. These embodiments include novel characteristics different from one another. Accordingly, these embodiments contribute to achieving objects or solving problems different from one another and contribute to obtaining advantages different from one another.

First Embodiment

Figure 1:
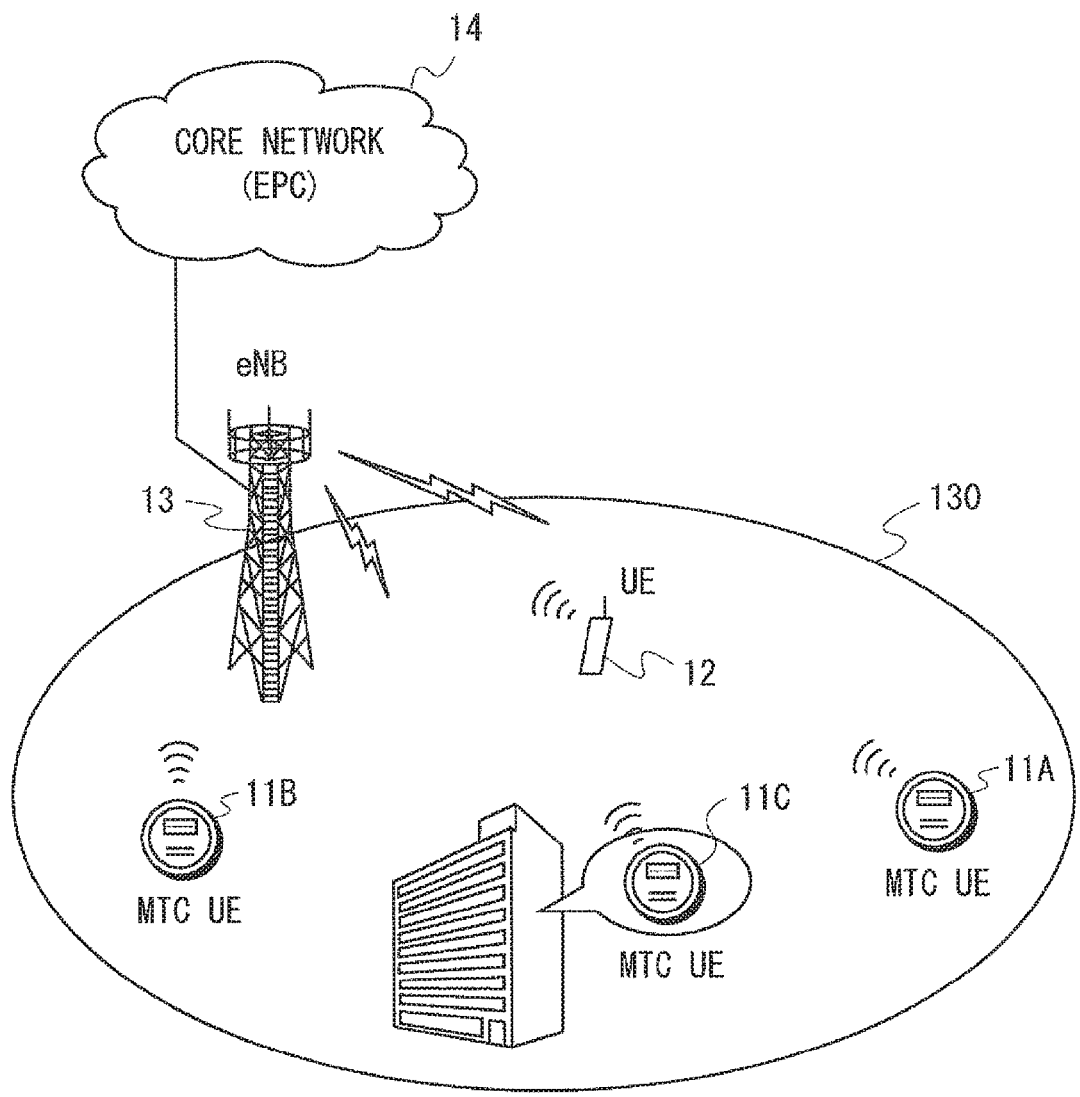
FIG. 1 is a diagram showing a configuration example of a radio communication system according to a first embodiment.

FIG. 1 shows a configuration example of a radio communication system according to this embodiment. This radio communication system provides communication services, such as voice communication or packet data communication or both, for example. With reference to FIG. 1, the radio communication system includes M2M terminals 11 (11A, 11B, 11C), a normal radio terminal 12 which is not an M2M terminal, a base station 13, and a core network 14. The radio terminal 12 is, for example, a mobile telephone, a smartphone, a tablet computer, or a notebook PC. The M2M terminals 11A, 11B, and 11C, and the radio terminal 12 are located in a cell 130 of the base station 13. In this embodiment, the radio communication system is described as being a 3GPP LTE system. That is, the M2M terminals 11 correspond to MTC UEs, the radio terminal 12 corresponds to a normal UE which is not an MTC UE, the base station 13 corresponds to an eNodeB (eNB), and the core network 14 corresponds to an Evolved Packet Core (EPC).

In FIG. 1, the distance between the MTC UE 11A and the eNB 13 is larger than the distance between the MTC UE 11B and the eNB 13. Accordingly, it is assumed that the MTC UE 11A has a large pathloss and its radio quality is degraded. Further, the MTC UE 11C is installed in a building and, accordingly, it is thus assumed that its radio quality is more degraded compared to a case in which the MTC UE 11C is located outdoors. Furthermore, if the capabilities or functions of the MTC UEs 11 (11A, 11B, and 11C) are limited compared to those of the normal UE 12 (e.g., a lower maximum transmission power, a smaller number of reception antennas, no support of high-order modulations), it is expected that degradation in radio quality of the MTC UEs 11 will become more serious. Therefore, the MTC UEs 11 according to this embodiment are configured to support the aforementioned Enhanced Coverage Mode (ECM) and to perform coverage enhancement processing in the ECM.

As already stated above, the coverage enhancement processing in the ECM can be said as processing for enhancing or improving communication characteristics (communication quality) of MTC UEs. As already stated above, the coverage enhancement processing in the ECM may include at least one of the following processing (a) to (d) or may include other processing (e.g., (e) and (f)):

(a) Repeatedly transmitting broadcast information on a PBCH a number of extra times as compared to the normal operation by a predetermined number of times;
(b) Repeatedly transmitting a PPACH (PRACH preamble) a predetermined number of times;
(c) Repeatedly transmitting a PDSCH over multiple subframes;
(d) Repeatedly transmitting a PUSCH over multiple subframes;
(e) Increasing the power spectral density (PSD) of one or both of a PDSCH and a PUSCH (PSD boosting); and
(f) Performing frequency hopping during repetitive transmission of one or both of a PDSCH and a PUSCH.

The subframe is a unit constituting a LTE radio frame. One radio frame has a length of ten milliseconds and is composed of ten subframes. Therefore, one subframe has a length of one millisecond. One subframe includes 14 symbols in a time domain (single carrier frequency division multiple access (SC-FDMA) symbols in uplink and orthogonal frequency division multiplexing (OFDM) symbols in downlink).

In the following description, communication control for the ECM according to this embodiment is described. The eNB 13 according to this embodiment receives, from the EPC 14, history information indicating whether or not the coverage enhancement processing regarding the ECM (e.g., PDSCH/PUSCH repetition) was executed in previous communication with the MTC UE (M2M terminal) 11. The eNB 13 then controls communication between the MTC UE 11 and the eNB 13 using the coverage enhancement processing regarding the ECM based on the history information received from the EPC 14. The eNB 13 may receive the history information of the MTC UE 11 from a core network node (e.g., Mobility Management Entity (MME)) included in the EPC 14.

For example, the eNB 13 may determine whether to execute the coverage enhancement processing regarding the ECM in communication between the MTC UE 11 and the eNB 13 based on the received history information. More specifically, in response to the history information indicating that the coverage enhancement processing regarding the ECM was executed for the MTC UE 11, the eNB 13 may transmit to the MTC UE 11 an instruction to execute the coverage enhancement processing regarding the ECM (e.g., ECM configuration). The eNB 13 may communicate with the MTC UE 11 assuming that the ECM is being performed in the MTC UE 11 without transmitting an explicit instruction.

The ECM configuration may include, for example, at least one of the following information items:

Configuration information regarding reception of broadcast information (PBCH);
Configuration information regarding reception of system information (System Information Block (SIB));
Configuration information regarding reception of paging (Paging Channel (PCH));
Configuration information regarding reception of downlink control information (Physical Downlink Control Channel (PDCCH));
Configuration information regarding reception of downlink data (PDSCH);
Configuration information regarding transmission of uplink control information (Physical Uplink Control Channel (PUCCH));
Configuration information regarding transmission of uplink data (PUSCH); and
Configuration information regarding measurement reporting of radio quality (Measurement Report).

The configuration information regarding reception of the broadcast information (PBCH) and the configuration information regarding reception of the system information (SIB) may be, for example, information indicating which subframe(s) and/or which OFDM symbol(s) is used to repeatedly transmit the broadcast information and (which kind of) system information. The configuration information regarding reception of paging may be, for example, information indicating which subframe(s) is used to repeatedly transmit paging. The configuration information regarding reception of the downlink control information (PDCCH) and reception of the downlink data (PDSCH) may be, for example, information indicating how many times they are repeatedly transmitted or may be information indicating which subframe(s) is used for repeatedly transmitting them. The configuration information regarding transmission of the uplink control information (PUCCH) and the transmission of the uplink data (PUSCH) may be, for example, information indicating how many times they are repeatedly transmitted or may be information indicating which subframe(s) is used for repeatedly transmitting them. The configuration information regarding measurement reporting of radio quality may be an offset value or a threshold applied to the measurement result of the radio quality while the ECM is being executed or may be an offset value or a threshold applied to determination on the report of the measurement result of the radio quality while the ECM is being executed.

Further, different operations regarding the ECM performed by the MTC UE 11 may be defined for multiple ECM levels. In this case, the ECM configuration may specify the operation level that the MTC UE 11 should execute.

When the MTC UE 11 has instructed to execute the ECM, the MTC UE 11 may continue holding the ECM configuration and continue executing the ECM even after transitioning from RRC_CONNECTED to RRC_IDLE. Alternatively, even after transitioning to RRC_IDLE, the MTC UE 11 may continue executing the ECM based on the ECM configuration broadcasted in the cell which the MTC UE 11 camps on. Further, after the MTC UE 11 has transitioned again to RRC_CONNECTED, the MTC UE 11 may continue executing the ECM autonomously based on the ECM configuration that the MTC UE 11 has already held or the ECM configuration broadcasted in the cell which the MTC UE 11 camps on, or the MTC UE 11 may initiate executing the ECM upon receiving from the eNB 13 an instruction to execute the ECM.

As described above, the eNB 13 receives from the EPC 14 the history information, which indicates whether the coverage enhancement processing regarding the ECM was executed in previous communication with the MTC UE 11, and controls communication using the coverage enhancement processing with the MTC UE 11 based on this history information, whereby the following effects can be expected. That is, the eNB 13 does not necessarily require acquisition of radio quality of the MTC UE 11 (e.g., RSRP, RSRQ, CQI) and analysis of the acquired radio quality to determine whether to apply the coverage enhancement processing regarding the ECM (e.g., PDSCH/PUSCH repetition) to the MTC UE 11. This is because the eNB 13 can use the history information to determine whether or not the ECM can be applied (or whether the coverage enhancement processing of the ECM is efficient) to the MTC UE 11, which has established a radio connection with the eNB 13. Therefore, according to this embodiment, it is possible to reduce time (delay) required to determine whether to apply the coverage enhancement processing regarding the ECM to the MTC UE 11.

Next, examples of the time when the eNB 13 receives the history information of the MTC UE 11 from the EPC 14 are described. The eNB 13 may acquire the history information of the MTC UE 11 from the EPC 14 when it determines whether to apply the coverage enhancement processing regarding the ECM to the MTC UE 11. For example, the eNB 13 may receive the history information from the EPC 14 when the eNB 13 establishes a radio connection (Radio Resource Control (RRC) Connection) with the MTC UE 11, or in other words, when the MTC UE 11 transitions to the connected state (RRC_CONNECTED) from the idle state (RRC_IDLE). Alternatively, the eNB 13 may receive the history information from the EPC 14 during a procedure for establishing a bearer (Evolved Packet System (EPS) bearer) between the MTC UE 11 and the EPC 14 (e.g., attach procedure, service request procedure). According to these examples, the eNB 13 can promptly determine whether to apply the coverage enhancement processing regarding the ECM to the MTC UE 11 during the procedure for establishing a radio connection with the MTC UE 11 or during the bearer establishment procedure.

Next, an example of operations for storing, in the EPC 14, the terminal information regarding the MTC UE 11, which indicates whether the coverage enhancement processing regarding the ECM was executed in previous communication between the MTC UE 11 and the eNB 13, is described. When releasing the radio connection with the MTC UE 11, the eNB 13 may send, to the EPC 14, terminal information (UE context) indicating whether the coverage enhancement processing regarding the ECM has been executed for the MTC UE 11. The UE context, which has been sent to the EPC 14, is transmitted as the history information of the MTC UE 11 to the eNB 13 that is the same as or different from the source eNB that has sent the terminal information. In other words, the eNB 13 is configured to send to the EPC 14 the UE context regarding the MTC UE 11, which indicates whether the coverage enhancement processing regarding the ECM has been executed in communication between the MTC UE 11 and the eNB 13, in order to store it in the EPC 14, and also configured to read out and use the UE context from the EPC 14.

As already stated above, the context of the MTC UE 11 that is held by the eNB 13 while the MTC UE 11 is in the connected state (RRC_CONNECTED) is released (deleted) when the MTC UE 11 transitions to the idle state (RRC_IDLE). Therefore, by storing, in the EPC 14, the UE context (indicating whether the coverage enhancement processing regarding the ECM was executed for the MTC UE 11), which has been held in the eNB 13 while the MTC UE 11 is in the connected state, the eNB 13 can utilize the UE context stored in the EPC 14 as the history information in a future access of the MTC UE 11.

In this embodiment, each MTC UEs 11 may be a terminal that is fixedly installed and is substantially stationary, as illustrated in FIG. 1. In this case, each MTC UE 11 repeatedly transitions between the connected state (RRC_CONNECTED) and the idle state (RRC_IDLE) in one cell of one eNB 13. Alternatively, each MTC UE 11 may be a terminal that has mobility (e.g., a terminal that is installed in a transportation machine such as a vehicle, a railway vehicle, or a ship). In this case, the MTC UE 11 may move through cells of one eNB 13 or through cells of different eNBs 13. One scenario regarding the MTC UE 11 with mobility is as follows. First, the MTC UE 11 is instructed to execute the ECM while it is in RRC_CONNECTED in a cell of one eNB 13, performs data communication using the ECM, and then transitions to RRC_IDLE. Next, the MTC UE 11 reselects another cell (Cell reselection) while it is in RRC_IDLE. Then, the MTC UE 11 again transitions to RRC_CONNECTED in a cell different from the cell in which the MTC UE 11 was previously in RRC_CONNECTED. At this time, the EPC 14 sends, to the eNB 13 that manages the cell which the MTC UE 11 newly camps on, information (ECM status, history information) indicating whether the MTC UE 11 executed the ECM. The EPC 14 may notify the eNB 13 of, for example, a physical cell identifier (Physical Cell Identity (PCI)) or a global cell identifier (Cell Global Identity (CGI)) in order to indicate the cell in which the MTC UE 11 previously executed the ECM.

Figure 2:
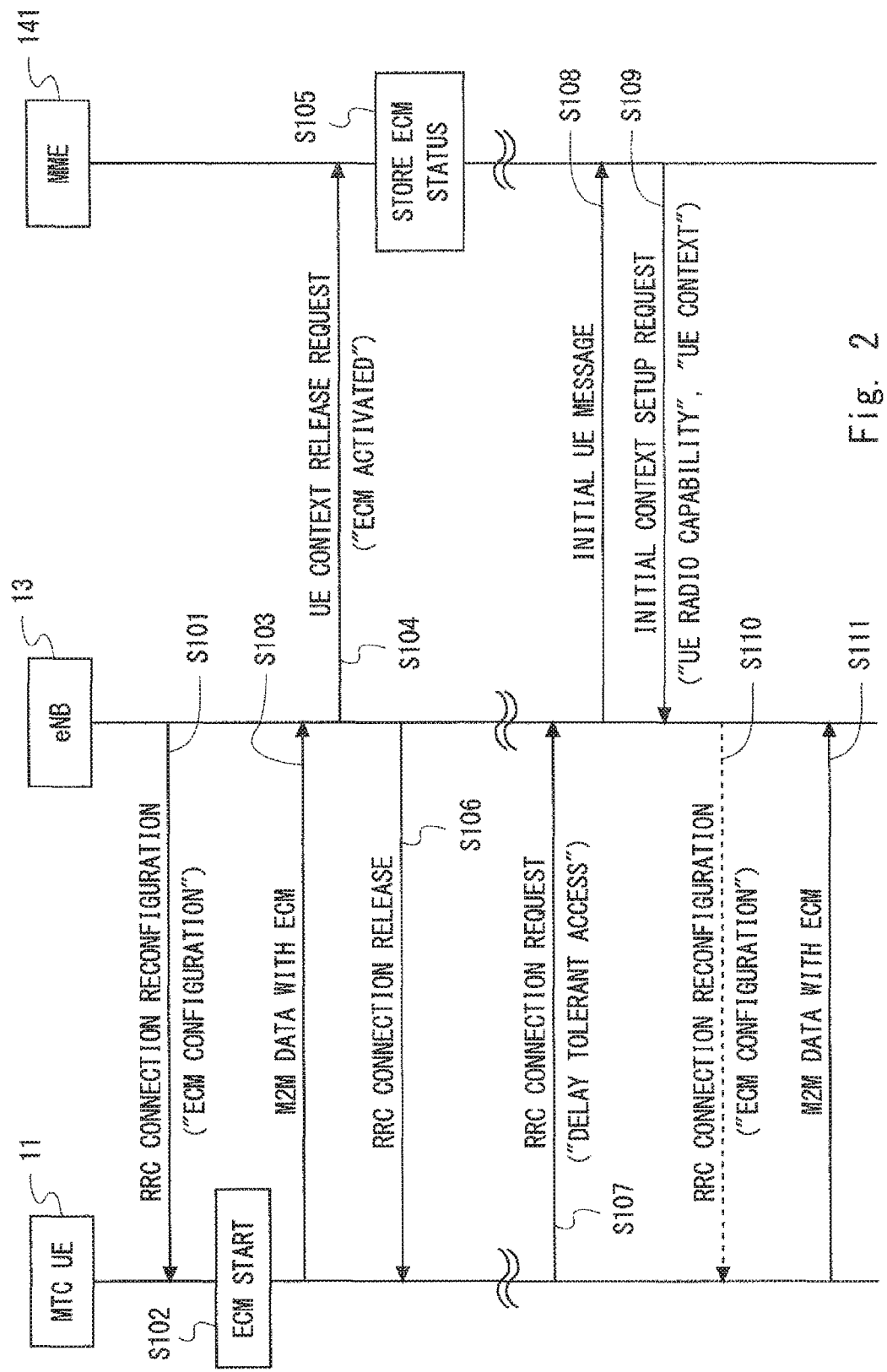
FIG. 2 is a sequence diagram showing one example of communication procedures according to the first embodiment.

FIG. 2 is a sequence diagram showing one example of operations of the MTC UE 11, the eNB 13, and a core network node 141 according to this embodiment. The core network node 141 is a node included in the EPC 14. The core network node 141 may be one physical entity or may include a plurality of entities. The core network node 141 may include, for example, an MME or a Home Subscriber Server (HSS), or both. FIG. 2 shows only the messages that are necessary for explanation of this embodiment and some messages included in the procedure specified in the LTE standard are not shown.

In Step S101 of FIG. 2, the eNB 13 decides to perform the coverage enhancement processing regarding the ECM (e.g., PDSCH/PUSCH repetition) for the MTC UE 11 and transmits ECM configuration information (ECM configuration) to the MTC UE 11. In the example shown in FIG. 2, the ECM configuration is transmitted using an RRC Connection Reconfiguration message. In Step S102, the MTC UE 11 starts executing the ECM (i.e., coverage enhancement processing (e.g., reception of a repeated PDSCH, repeated transmission of a PUSCH)) in accordance with the ECM configuration received from the eNB 13 (ECM start). In Step S103, the MTC UE 11 performs data communication in accordance with the ECM configuration (M2M data with ECM).

In Step S104, the eNB 13 determines that it is possible to change the state of the MTC UE 11 back to the idle state (RRC_IDLE) and requests the core network node 141 to release the S1-AP signaling connection and the S1 bearer (or the radio access bearer) regarding the MTC UE 11 (S1 UE Context Release Request). In Step S105, the core network node 141 releases the S1-AP signaling connection and the S1 bearer in response to the request from the eNB 13, but the core network node 141 holds ECM status information (ECM status) indicating that the ECM was executed by the MTC UE 11 (Store ECM status). The ECM status information (ECM status) corresponds to the history information stated above. The ECM status information (ECM status) may be held in the MME together with an EPS bearer context of the MTC UE 11. Alternatively, the ECM status information (ECM status) may be sent to the HSS via the MME and may be held in the HSS. In Step S106, the eNB 13 transmits to the MTC UE 11 an instruction to transition to RRC_IDLE (RRC Connection Release). In response to receiving this instruction, the MTC UE 11 transitions from RRC_CONNECTED to RRC_IDLE.

In Step S107, in response to arrival of a periodic or non-periodic communication opportunity, the MTC UE 11 transmits a request for establishing a radio connection to the eNB 13 in order to start communication (RRC Connection Request). The MTC UE 11 may transmit an RRC Connection Request containing an Establishment cause set to "delayTolerantAccess" in order to indicate a delay tolerant access. The MTC UE 31 transitions to RRC_CONNECTED upon completion of the procedure for establishing the radio connection (RRC Connection) (not shown).

In Step S108, the eNB 13 sends a request for establishing an EPS bearer for the MTC UE 11 to the core network node 141 (Initial UE message). This Initial UE message encapsulates a Non-Access Stratum (NAS) message (e.g., NAS: Service Request, NAS: Attach Request) from the MTC UE 11. In Step S109, in response to receiving the NAS message encapsulated in the Initial UE message, the core network node 141 sends, to the eNB 13, information that is necessary to establish a radio access bearer for the MTC UE 11 (Initial Context Setup Request).

The message in Step S109 may include, for example, a terminal capability (UE radio capability) and a UE context. At this time, the UE context may include the ECM status information (ECM status) indicating that the MTC UE 11 previously executed the ECM. Further, the UE context may include mobility information of the MTC UE 11. If the ECM status information indicates that the MTC UE 11 previously executed the ECM and the mobility information indicates that the MTC UE 11 is a stationary or near-stationary terminal, the eNB 13 may decide to continuously execute the ECM for the MTC UE 11.

In Step S110, the eNB 13 may transmit the ECM configuration information (ECM configuration) together with radio resource configuration information (RRC Configuration) in order to cause the MTC UE 11 to execute the ECM (RRC Connection Reconfiguration). In Step S111, the MTC UE 11 performs data communication based on the ECM configuration information received from the eNB 13 in Step S110 or based on the ECM configuration information that the MTC UE 11 has previously received and held (M2M data with ECM).

Second Embodiment

A configuration example of a radio communication system according to this embodiment may be the same as that of FIG. 1 described in the first embodiment. In the above first embodiment, the example in which the eNB 13 receives from the EPC 14 the history information indicating whether the coverage enhancement processing regarding the ECM (e.g., PDSCH/PUSCH repetition) was executed in previous communication with the MTC UE 11 has been shown. Alternatively, in this embodiment, an eNB 23 receives, from an MTC UE 21, history information indicating whether the coverage enhancement processing regarding the ECM (e.g., PDSCH/PUSCH repetition) was executed in previous communication of the MTC UE 21. The eNB 23 then controls communication between the MTC UE 21 and the eNB 23 using the coverage enhancement processing regarding the ECM based on the history information received from the MTC UE 21. For example, when the eNB 23 receives from the MTC UE 21 a notification indicating that the MTC UE 21 previously executed the ECM, the eNB 23 may cause the MTC UE 21 to continuously execute the ECM or may determine whether or not execution of the ECM is necessary again.

In this embodiment, when the MTC UE 21 receives an instruction to execute the ECM from the eNB 23, the MTC UE 21 may hold ECM configuration information (ECM configuration) even after the MTC UE 21 has transitioned to RRC_IDLE from RRC_CONNECTED or may simply memorize that it executed the ECM. When the MTC UE 21 again transitions to the RRC_CONNECTED, the MTC UE 21 notifies the eNB 23 that it executed the ECM before. Further, the MTC UE 21 may transmit and receive messages to transition to the RRC_CONNECTED (i.e., message transmitted during an RRC connection establishment procedure) while executing the ECM (i.e., while performing the ECM-specific coverage enhancement processing regarding the ECM). For example, the MTC UE 21 may use any one of the ECM-specific radio resources to transmit a PRACH preamble. Further, the MTC UE 21 may autonomously repeat transmission of the PRACH preamble.

According to this embodiment, it is possible to achieve the effects that are similar to those achieved by the first embodiment. That is, in this embodiment, the eNB 23 receives from the MTC UE 21 the history information, which indicates whether the coverage enhancement processing regarding the ECM was executed in previous communication of the MTC UE 21, and controls communication using the coverage enhancement processing with the MTC UE 21 based on this history information. Therefore, the eNB 23 does not necessarily require acquisition of radio quality of the MTC UE 21 (e.g., RSRP, RSRQ, CQI) and analysis of the acquired radio quality to determine whether to apply the coverage enhancement processing regarding the ECM (e.g., PDSCH/PUSCH repetition) to the MTC UE 21. This is because the eNB 23 can use the history information to determine whether or not the ECM can be applied (or whether the coverage enhancement processing of the ECM is efficient) to the MTC UE 21, which has established a radio connection with the eNB 23. Therefore, according to this embodiment, it is possible to reduce time (delay) required to determine whether to apply the coverage enhancement processing regarding the ECM to the MTC UE 21.

Next, examples of the time when the eNB 23 receives the history information of the MTC UE 21 from the MTC UE 21 are described. The eNB 23 may receive the history information from the MTC UE 21 during a procedure for establishing a radio connection (RRC Connection) with the MTC UE 21, or in other words, when the MTC UE 21 transitions to the connected state (RRC_CONNECTED) from the idle state (RRC_IDLE). Alternatively, the eNB 23 may receive the history information from the MTC UE 21 while a procedure for establishing a bearer between the MTC UE 21 and the EPC (EPS bearer) (e.g., attach procedure, service request procedure) is being performed. According to these examples, the eNB 23 can promptly determine whether to apply the coverage enhancement processing regarding the ECM to the MTC UE 21 during the procedure for establishing a radio connection with the MTC UE 21 or during the bearer establishment procedure.

Further, similar to the first embodiment, in this embodiment, the MTC UE 21 may be a terminal that has mobility (e.g., a terminal that is installed in a transportation machine such as a vehicle, a railway vehicle, or a ship). In this case, the MTC UE 21 is instructed to execute the ECM while it is in RRC_CONNECTED in a cell of one eNB 23, performs data communication using the ECM, and then transitions to RRC_IDLE. Next, the MTC UE 21 reselects another cell (Cell reselection) while it is in RRC_IDLE. Then, the MTC UE 21 again transitions to RRC_CONNECTED in a cell different from the cell in which the MTC UE 21 was previously in RRC_CONNECTED. At this time, the MTC UE 21 sends, to the eNB 23 that manages the cell which the MTC UE 21 newly camps on, information indicating whether the MTC UE 21 executed the ECM before (ECM status, history information). The MTC UE 21 may notify the eNB 23 of, for example, a physical cell identifier (PCI) or a global cell identifier (CGI) in order to indicate the cell in which the MTC UE 21 previously executed the ECM.

Figure 3:
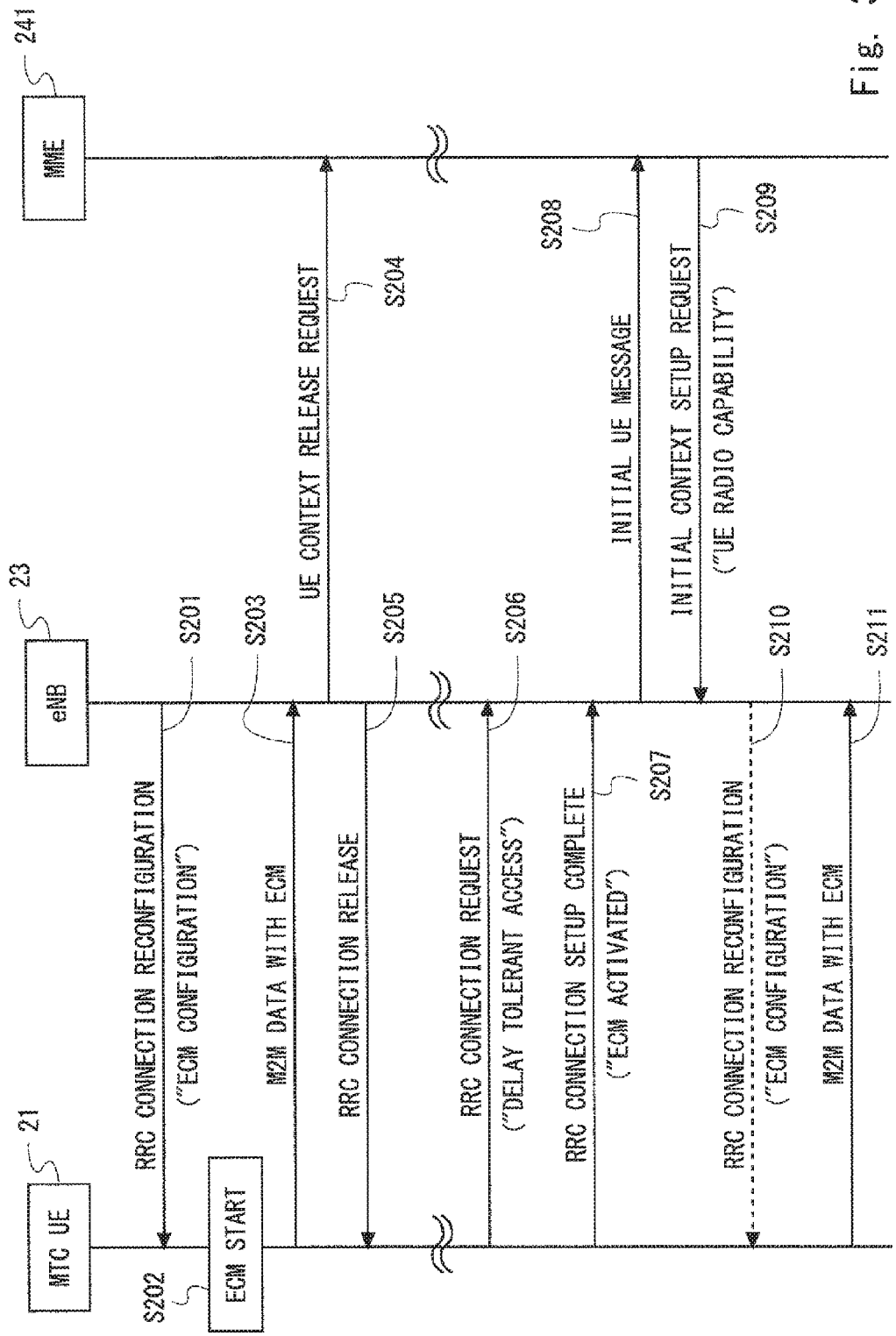
FIG. 3 is a sequence diagram showing one example of communication procedures according to a second embodiment.

FIG. 3 is a sequence diagram showing one example of operations of the MTC UE 21, the eNB 23, and a core network node 241 according to this embodiment. The core network node 241 is a node that is included in the EPC (e.g., an MME or an HSS or both). FIG. 3 shows only the messages that are necessary for explanation of this embodiment and some messages included in the procedure specified in the LTE standard are not shown.

The processes in Steps S201 to S203 in FIG. 3 are similar to those in Steps S101 to S103 in FIG. 2. In Step S204, the eNB 23 determines to change the state of the MTC UE 21 back to the idle state (RRC_IDLE) and requests the core network node 241 to release the S1-AP signaling connection and the S1 bearer (or radio access bearer) regarding the MTC UE 21 (S1 UE Context Release Request). The core network node 241 releases the S1-AP signaling connection and the S1 bearer in response to the request from the eNB 23. In Step S205, the eNB 23 transmits to the MTC UE 21 an instruction to transition to RRC_IDLE (RRC Connection Release). In response to receiving this instruction, the MTC UE 21 transitions from RRC_CONNECTED to RRC_IDLE.

In Step S206, in response to arrival of a periodic or non-periodic communication opportunity, the MTC UE 21 transmits a request for establishing a radio connection to the eNB 23 in order to start communication (RRC Connection Request). The MTC UE 21 may transmit an RRC Connection Request containing an Establishment cause set to "delayTolerantAccess" in order to indicate a delay tolerant access. In Step S207, the MTC UE 21 notifies the eNB 23 of the history information indicating that the MTC UE 21 previously executed the ECM. At this time, the MTC UE 21 may also notify the eNB 23 that the MTC UE 21 is currently executing the ECM.

In the example shown in FIG. 3, the history information in Step S207 is transmitted using an RRC Connection Setup Complete message. Since the RRC Connection Setup Complete message is the final message that is transmitted during an RRC connection establishment a procedure, it can be said that the history information transmitted in Step S207 is transmitted during an RRC connection establishment procedure. Further, the RRC Connection Setup Complete message contains a NAS message (e.g., NAS: Service Request, NAS: Attach Request). That is, since the RRC Connection Setup Complete message containing a NAS message is the first message transmitted during a bearer establishment procedure, it can also be said that the history information in Step S207 is transmitted during a bearer establishment procedure.

In Step S208, the eNB 23 transmits a request for establishing an EPS bearer for the MTC UE 21 to the core network node 241 (Initial UE message). In Step S209, in response to receiving the NAS message encapsulated into the Initial UE message, the core network node 241 sends, to the eNB 23, information that is necessary to establish a radio access bearer for the MTC UE 21 (Initial Context Setup Request). The message in Step S209 may include, for example, a terminal capability (UE radio capability).

In Step S210, the eNB 23 may transmit the ECM configuration information (ECM configuration) together with the radio resource configuration information (RRC Configuration) in order to cause the MTC UE 21 to execute the ECM (RRC Connection Reconfiguration). In Step S211, the MTC UE 21 performs data communication based on the ECM configuration information received from the eNB 23 in Step S210 or based on the ECM configuration information that the MTC UE 21 has previously received and held (M2M data with ECM).

Third Embodiment

A configuration example of a radio communication system according to this embodiment may be the same as that of FIG. 1 described in the first embodiment. In this embodiment, a method for determining in an eNB 33 whether to apply the coverage enhancement processing regarding the ECM (e.g., PDSCH/PUSCH repetition) to a specific MTC UE 31 is described. The technical ideas described in this embodiment may be used alone or combination with the technical ideas described in the first or second embodiment stated above.

In this embodiment, the eNB 33 controls communication between the MTC UE 31 and the eNB 33 using the coverage enhancement processing regarding the ECM (e.g., PDSCH/PUSCH repetition) based on at least one of: a terminal capability of the MTC UE 31 (UE capability); terminal information on the MTC UE 31 (UE information); a communication characteristic of the MTC UE 31 (Communication performance); and radio quality of the MTC UE 31 (Radio quality), and further based on an access cause received from the MTC UE 31 (Access cause). In other words, the eNB 33 determines whether to apply the coverage enhancement processing regarding the ECM (e.g., PDSCH/PUSCH repetition) to the MTC UE 31 based on at least one of the terminal capability, terminal information, communication characteristic, and radio quality of the MTC UE 31, and further based on the access cause received from the MTC UE 31.

Specific examples of the access cause, terminal capability, terminal information, communication characteristics, and radio quality are described below. However, the contents of the access cause, terminal capability, terminal information, communication characteristics, and radio quality are not limited to them.

The access cause may include at least one of the following two items:
Purpose of establishing an RRC connection (Establishment cause); and
Service type.

The purpose of establishing an RRC connection may specify, for example, (a) an emergency call (emergency), (b) a high priority access (highPriorityAccess), (c) an access for mobile terminated communication (mt-Access), mobile originated signaling (mo-Signalling), (d) terminal originated data transmission (mo-Data), (e) a delay tolerant access (delayTolerantAccess), (f) a low priority access (lowPriorityAccess), (g) an access for small data communication (smallDataAccess), (h) an access for small packet communication (smallPacketAccess), (i) a limited access (limitedAccess), (j) an access for a limited service (limitedService), (k) an M2M-type access (m2mAccess), or (l) an access using the ECM (ecmAccess).

The service type may specify, for example, (a) a real-time service, (b) a non real-time service, or (c) M2M-type communication.

The terminal capability may include, for example, at least one of the following three items:
  Radio access capability;
  Device capability; and
  Terminal category (UE category).

The radio access capability may include, for example, (a) information indicating whether the UE is supporting the terminal function defined in the 3GPP LTE (e.g., flag bit) or (b) information indicating whether the UE is supporting the ECM. In order to indicate whether the UE is supporting the ECM, an information element (IE) named "EcmSupport" may be defined. For example, the true value of "EcmSupport" indicates that the ECM is supported (Supported) and the false value thereof indicates that the ECM is not supported (NotSupported). Further, an IE named "EnhancedCoverageMode" may be defined. For example, when EcmSupport is set to a value "Supported", it indicates that the UE is supporting the ECM. On the other hand, if the UE does not support the ECM, EcmSupport may be set to a value "NotSupported". Alternatively, no sending of this IE may imply that the UE is not supporting the ECM.

The device capability may include, for example, (a) information indicating that the UE is an MTC UE, (b) information indicating that communication capability of the UE is limited (compared to that of a normal UE), or (c) information indicating that the UE performs only a specific communication (e.g., M2M-type communication).

The terminal category may include, for example, (a) information indicating one of terminal categories defined in the 3GPP LTE or (b) information indicating one of access classes defined in the 3GPP LTE. New terminal category or new access class may be defined for MTC UEs performing M2M-type communication. For example, a new category (e.g., category 0) for MTC UEs whose functions are limited in order to implement it at a low cost may be defined. Further or alternatively, a new access class (AC) that indicates infrequent communication or allows only infrequent communication may be defined.

The terminal information may include at least one of the following three items:
  Terminal type (UE type);
  Device type; and
  Terminal context (UE context).

The terminal type may include, for example, (a) information indicating whether the UE is a normal UE (non-MTC UE) or an MTC UE, (b) information indicating whether the UE has mobility (or information indicating that the UE has no mobility), or (c) information indicating whether there is a power supply for the UE.

The device type may include, for example, (a) information indicating the type of the operating system (OS) installed in the UE or (b) information indicating the type of the M2M-type communication performed by the UE (i.e., sub-category information of the M2M).

The terminal context may include, for example, (a) information on the aforementioned terminal capability, (b) RRC control information configured in the UE (e.g., information contained in a RadioResrouceConfigCommon IE and a RadioResourceConfigDedicated IE), (c) information regarding the mobility of the UE (mobility information), (d) information indicating whether the UE is executing the ECM (ECM execution information), or (e) information indicating whether the UE executed the ECM before (e.g., when the UE was in the RRC_CONNECTED state last time) (ECM status information).

The communication characteristic may include, for example, at least one of the following two items:
  Performance measurement result (e.g., L2 measurement); and
  Statistical communication quality (e.g., KPI).

The performance measurement result may include, for example, (a) measurements result of throughput (e.g., Scheduled IP Throughput) by an eNB 33 (or Operation Administration and Maintenance (OAM)), (b) measurement results of packet loss (Packet Loss Rate), or (c) measurement results of packet discard (Packet Discard Rate).

The statistical communication quality may include, for example, (a) the number of handover attempts or a handover attempt rate, (b) a handover success rate or a handover failure rate, (c) a communication interval or a communication frequency, (d) a packet occurrence interval or a packet occurrence frequency, (e) a packet arrival interval (packet inter-arrival time) or a packet arrival frequency (packet inter-arrival rate), (f) an access interval or an access frequency, or (g) an interval or a frequency of an RRC connection establishment or a NAS connection establishment.

The radio quality may include, for example, at least one of the following two items:
  Received quality of a reference signal (Reference Signal (RS) received quality); and
  Channel quality indicator (CQI).

The received quality of a reference signal (RS) may include, for example, received power (RSRP), (b) reception quality (RSRQ), or a received power intensity (RSSI), of a downlink RS at the UE or (b) received power at the eNB 33 of an uplink reference signal (Sounding Reference Signal: SRS) transmitted by the UE.

The eNB 33 may receive the terminal capability or the terminal information of the MTC UE 31 stated above either from the MTC UE 31 or from the EPC.

According to this embodiment, the following effects may be expected. That is, if whether to apply the coverage enhancement processing regarding the ECM to the MTC UE 31 is determined based on only the access cause of the MTC UE 31, it will be impossible to sufficiently consider the status of each MTC UE 31. As already stated above, among the assumed coverage enhancement processing regarding the ECM, RACH repetition and PDSCH/PUSCH repetition are separately applied to each MTC UE. In the coverage enhancement processing separately applied to each MTC UE (e.g., RACH repetition and PDSCH/PUSCH repetition), consumed radio resources will increase as the number of MTC UEs that is performing the ECM increases. Accordingly, the determination regarding whether to execute the ECM is preferably performed considering the status of each of the MTC UEs. In this embodiment, besides the access cause of the MTC UE 31, the eNB 33 further considers at least one of the terminal capability, terminal information, communication characteristic, and radio quality of the MTC UE 31 when determining whether to execute the ECM. Therefore, according to this embodiment, it is possible to determine whether to execute the ECM with consideration of the status of each MTC UE.

Figure 4:
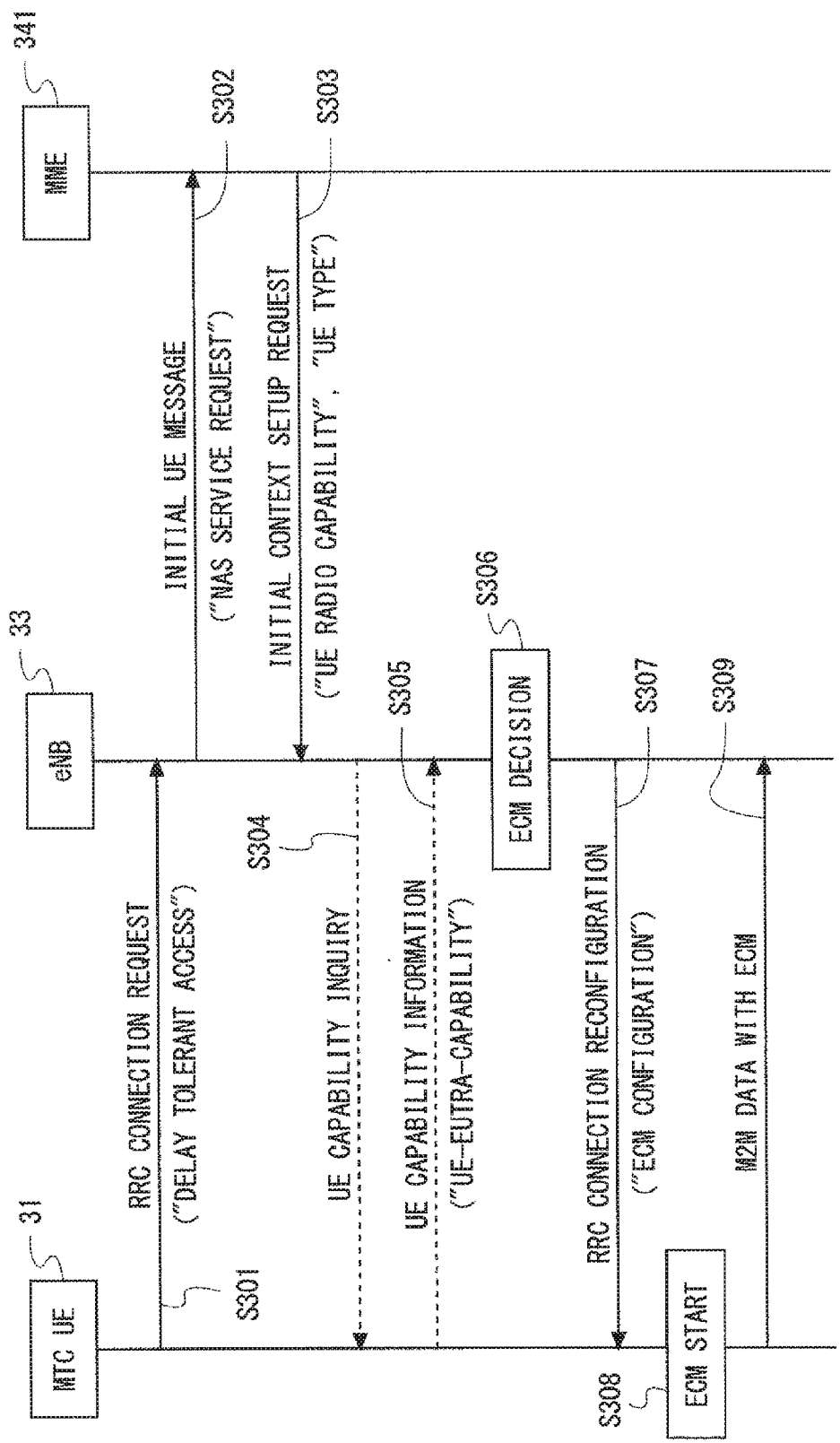
FIG. 4 is a sequence diagram showing one example of communication procedures according to a third embodiment.

FIG. 4 is a sequence diagram showing one example of operations of the MTC UE 31, the eNB 33, and the core network node 341 according to this embodiment. The core network node 341 is a node that is included in the EPC (e.g., an MME or an HSS or both). In the example shown in FIG. 4, the eNB 33 determines whether to apply the coverage enhancement processing regarding the ECM to the MTC UE 31 based on the access cause (e.g., Establishment cause), terminal capability (e.g., UE radio access capability), and terminal information (e.g., UE type) of the MTC UE 31. FIG. 4 shows only the messages that are necessary for explanation of this embodiment and some messages included in the procedure specified in the LTE standard are not shown.

The initial state of the MTC UE 31 shown in FIG. 4 is RRC_IDLE. In Step S301, in response to an arrival of a periodic or non-periodic communication opportunity, the MTC UE 31 transmits a request for establishing a radio connection to the eNB 23 in order to start communication (RRC Connection Request). The MTC UE 31 may transmit an RRC Connection Request containing an Establishment cause set to "delayTolerantAccess" in order to indicate a delay tolerant access. The MTC UE 31 transitions to RRC_CONNECTED upon completion of the procedure for establishing the radio connection (RRC Connection) (not shown).

In Step S302, the eNB 33 sends a request for establishing an EPS bearer for the MTC UE 31 to the core network node 341 (Initial UE message). This Initial UE message encapsulates a Non-Access Stratum (NAS) message (e.g., NAS: Service Request) from the MTC UE 31. In Step S303, in response to receiving the NAS message encapsulated in the Initial UE message, the core network node 341 sends, to the eNB 33, information that is necessary to establish a radio access bearer for the MTC UE 31 (Initial Context Setup Request). The message in Step S303 may include, for example, one or both of the terminal capability (UE radio capability) and the terminal type (UE type).

In Step S304, the eNB 33 requests the MTC UE 31 to transmit the terminal capability as necessary (UE Capability Inquiry). In Step S305, in response to the request from the eNB 33, the MTC UE 31 notifies the eNB 33 of the terminal capability of the MTC UE 31 (UE Capability Information). The message in Step S305 may contain, for example, UE-EUTRA-capability.

In Step S306, the eNB 33 determines whether to cause the MTC UE 31 to execute the ECM (in other words, whether to apply the coverage enhancement processing regarding the ECM to the MTC UE 31) (ECM decision). As one example, if the establishment cause of the MTC UE 31 indicates "delayTolerantAccess" and the radio access capability of the MTC UE 31 indicates supporting the ECM, the eNB 33 may decide to make the MTC UE 31 execute the ECM.

In Step S307, the eNB 33 transmits the ECM configuration information (ECM configuration) together with the radio resource configuration information (RRC Configuration) in order to make the MTC UE 31 execute the ECM. In Step S308, the MTC UE 31 starts executing the ECM in accordance with the radio resource configuration information and the ECM configuration information received from the eNB 13 (ECM start). In Step S309, the MTC UE 31 performs data communication while performing the coverage enhancement processing regarding the ECM (M2M data with ECM).

The procedure shown in FIG. 4 is merely one example. As another example, in addition to the access cause (e.g., Establishment cause), the terminal capability (e.g., UE radio access capability), and the terminal information (e.g., UE type), the eNB 33 may further consider one or both of the communication characteristic and the radio quality. Specifically, the eNB 33 may first determine to execute the ECM for the MTC UE 31 based on the information on the MTC UE 31 including the access cause, the terminal capability, and the terminal information. The eNB 33 may then determine whether to continue executing the ECM for the MTC UE 31 based on the communication characteristic of the MTC UE 31 or the radio quality of the MTC UE 31, or both. As stated above, since the eNB 31 considers the communication characteristic or the radio quality of the MTC UE 31, it is possible to determine necessity of performing the ECM more appropriately.

The eNB 33 may acquire, for example, the number of handover attempts (or an attempt rate) as the communication characteristic of the MTC UE 31, and if the eNB 33 determines that the MTC UE 31 is stationary or near-stationary based on the acquired information, the eNB 33 may continue executing the ECM. On the other hand, if the eNB 33 determines that the MTC UE 31 is moving, the eNB 33 may suspend (or stop) executing the ECM for the MTC UE 31. Further or alternatively, the eNB 33 may acquire the RSRP or the CQI as the radio quality of the MTC UE 31, and if the eNB 33 determines that the RSRP or the CQI acquired is smaller than a predetermined threshold, the eNB 33 may continue executing the ECM. On the other hand, if the eNB 33 determines that the radio quality of the MTC UE 31 is larger than the predetermined threshold, the eNB 33 may suspend (or stop) executing the ECM for the MTC UE 31.

As another example, the eNB 33 may acquire one or both of the communication characteristic and the radio quality of the MTC UE 31, and then determine whether execute the ECM for the MTC UE 31 based on the acquired information. At this time, the eNB 31 may use the previous communication characteristic or radio quality stored in the eNB 31 or another network apparatus (e.g., OAM or MME) instead of newly measuring the communication characteristic or radio quality of the MTC UE 31. It is thus possible to avoid degradation of the communication characteristic of the MTC UE 31 caused by the delay time due to waiting for determination of whether to execute the ECM for the MTC UE 31.

Fourth Embodiment

Figure 5:
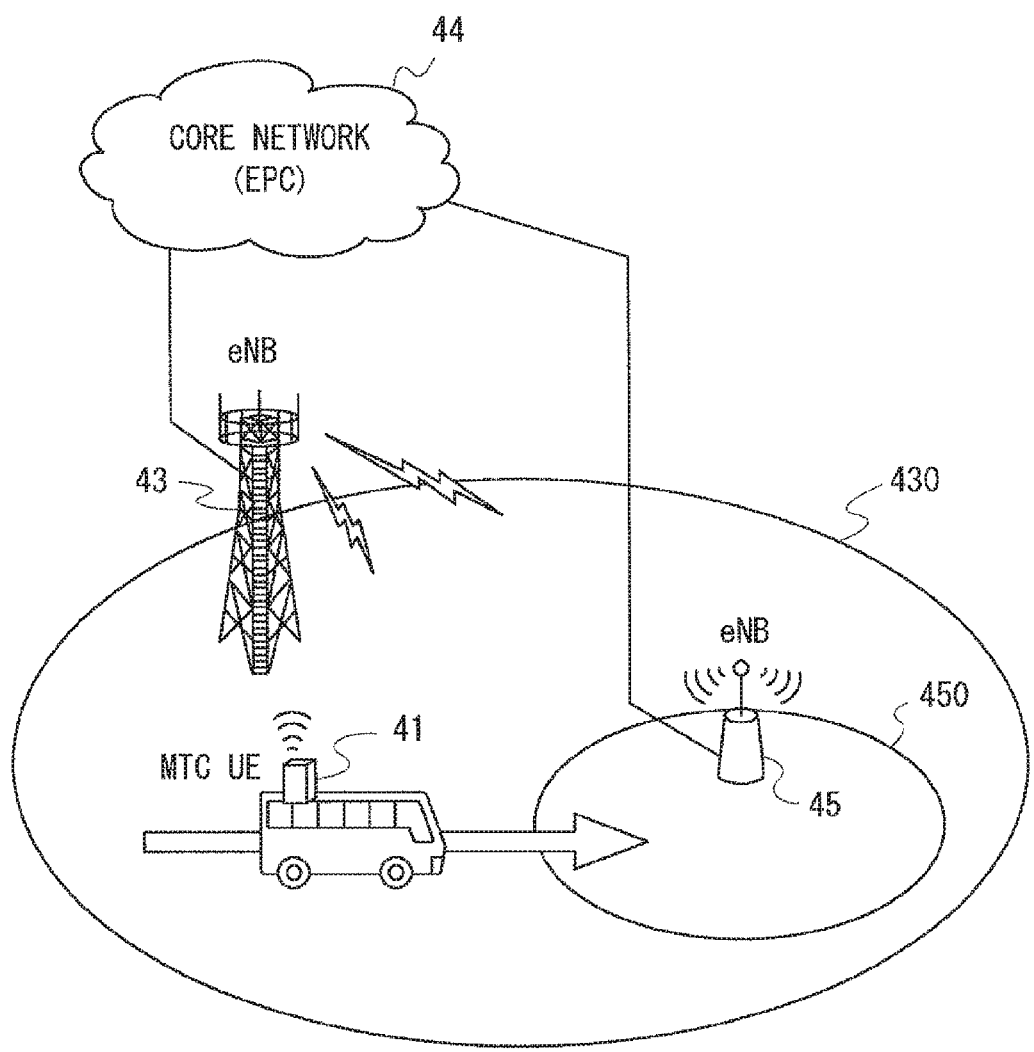
FIG. 5 is a diagram showing a configuration example of a radio communication system according to a fourth embodiment.

In this embodiment, control regarding handover of an MTC UE that supports the ECM is described. FIG. 5 shows a configuration example of a radio communication system according to this embodiment. Referring to FIG. 5, this radio communication system includes an MTC UE 41, an eNB 43, an eNB 45, and an EPC 44. The MTC UE 41 is installed in a transportation machine such as a vehicle, a railway vehicle, or a ship and therefore has mobility. FIG. 5 shows an example of a heterogeneous network (HetNet). That is, the eNB 43 manages a cell 430 and the eNB 45 manages a cell 450 that covers an area smaller than that covered by the cell 430. For example, the eNB 43 is a macro base station and the eNB 45 is a pico base station. This embodiment may, however, be applied to a homogeneous network in which the cell 430 and the cell 450 have the same degree of coverage.

In the following description, communication control for the ECM according to this embodiment is described. In this embodiment, the eNB 43 notifies the eNB 45 that the MTC UE 41 is executing the ECM (in other words, the MTC UE 41 is performing the coverage enhancement processing regarding the ECM) when the MTC UE 41 that is executing the ECM is handed over from the cell 430 of the eNB 43 to the neighbouring cell 450. The eNB 43 may notify the eNB 45 that the MTC UE 41 is executing the ECM (in other words, the MTC UE 41 is performing the coverage enhancement processing regarding the ECM) when the eNB 43 sends to the eNB 45 a handover request regarding the MTC UE 41. The eNB 45 may control communication using the ECM between the MTC UE 41 and the eNB 45 based on the notification received from the eNB 43. For example, the eNB 45 may determine whether to apply the ECM to communication between the MTC UE 41 and the eNB 45 based on the notification received from the eNB 43.

According to this embodiment, the following effects can be expected. That is, in this embodiment, the handover source base station (i.e., eNB 43) informs the target base station (i.e., eNB 45) whether the MTC UE 41 is executing the ECM. Therefore, the target base station (eNB 45) does not necessarily require acquisition of radio quality of the MTC UE 41 (e.g., RSRP, RSRQ, CQI) and analysis of the acquired radio quality in order to determine whether to apply the coverage enhancement processing regarding the ECM (e.g., PDSCH/PUSCH repetition) to the MTC UE 41. This is because the target base station (eNB 45) can use the notification received from the source base station (eNB 43) to determine whether or not the ECM can be applied (or whether the coverage enhancement processing of the ECM is efficient) to the MTC UE 41, on which the handover is to be performed. Therefore, according to this embodiment, it is possible to reduce time (delay) required for the target base station (target cell) to determine whether to apply the coverage enhancement processing regarding the ECM to the MTC UE 41, on which the handover is to be performed.

Figure 6:
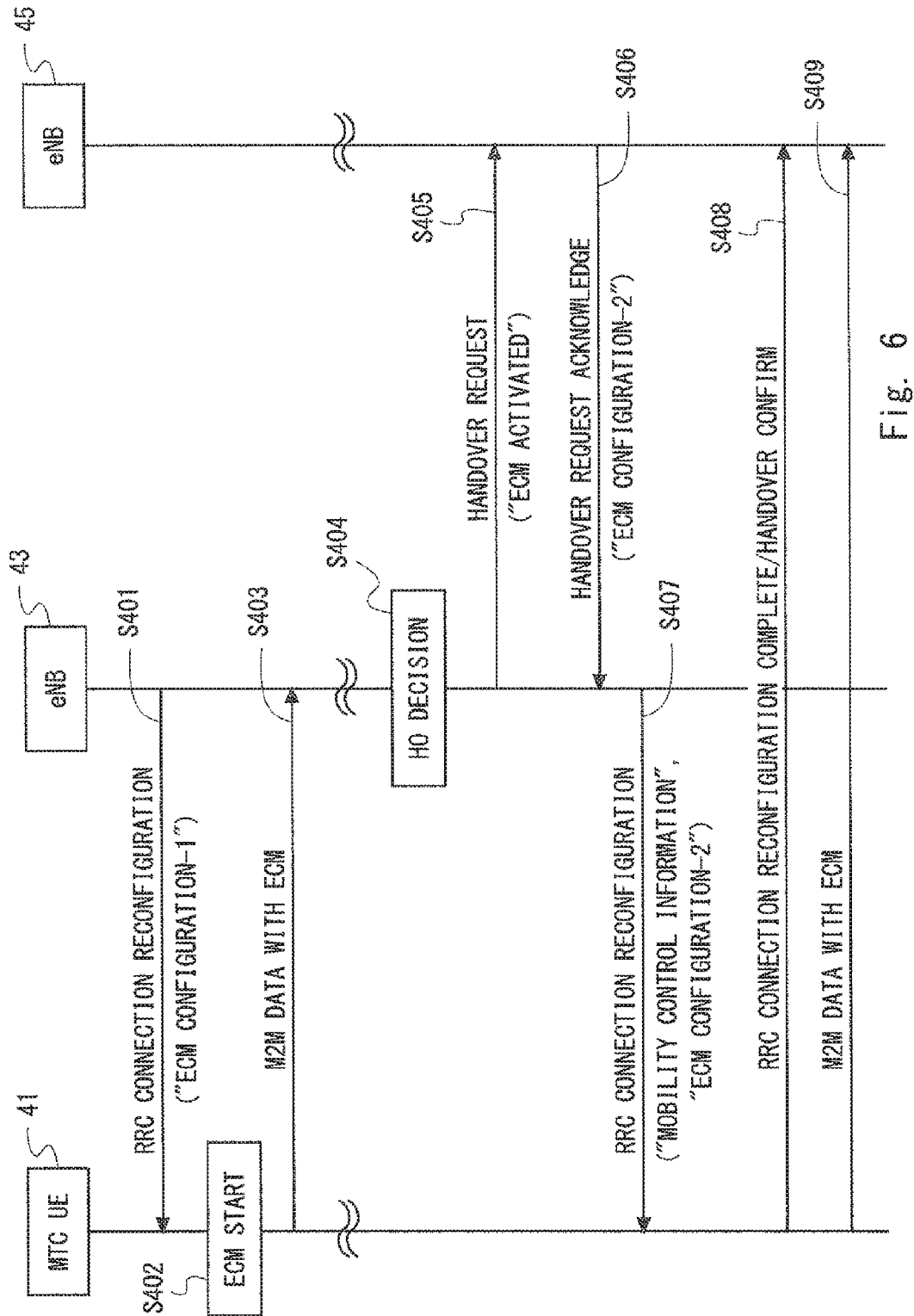
FIG. 6 is a sequence diagram showing one example of communication procedures according to the fourth embodiment.

FIG. 6 is a sequence diagram showing one example of operations of the MTC UE 41, the eNB 43, and the eNB 45 according to this embodiment. FIG. 6 shows only the messages that are necessary for explanation of this embodiment and some messages included in the procedure specified in the LTE standard are not shown. In Step S401, the MTC UE 41 camps on the cell 430 of the eNB 43. The eNB 43 transmits the ECM configuration information (ECM configuration-1) to the MTC UE 41. In the example shown in FIG. 6, the ECM configuration-1 is transmitted using the RRC Connection Reconfiguration message. In Step S402, the MTC UE 41 starts executing the ECM (i.e., coverage enhancement processing (e.g., reception of a repeated PDSCH, repeated transmission of a PUSCH)) in accordance with the ECM configuration received from the eNB 43 (ECM start). In Step S403, the MTC UE 41 performs data communication in accordance with the ECM configuration (M2M data with ECM).

In Step S404, the eNB 43 determines handover of the MTC UE 41 from the cell 430 of the eNB 43 to the neighbouring cell 450 of the eNB 45 (HO decision). In Step S405, the eNB 43 sends a handover request for the MTC UE 41 to the eNB 45 (Handover Request). The handover request in Step S405 contains information indicating that the MTC UE 41, on which the handover to be performed, is executing the ECM (ECM activated).

In Step S406, if the eNB 45 can accept the MTC UE 41, the eNB 45 sends a message for acknowledging the handover request to the eNB 43 (Handover Request Acknowledge). The acknowledgement message in Step S406 may contain the ECM configuration information that is necessary to execute the ECM in the target cell 450 (ECM configuration-2).

In Step S407, the eNB 43 transmits a handover instruction to the MTC UE 41 in response to receiving the acknowledgement message from the eNB 45 (RRC Connection Reconfiguration). The message in Step S407 (RRC Connection Reconfiguration) may contain the ECM configuration information that is necessary to execute the ECM in the target cell 450 (ECM configuration-2).

In Step S408, the MTC UE 41 is handed over from the cell 430 to the cell 450 and transmits a message indicating the completion of the handover to the target eNB 45 (RRC Connection Reconfiguration Complete/Handover confirm).

Although not shown in the drawing, in Step S408, the MTC UE 41 may transmit, to the eNB 45, information indicating that the MTC UE 41 executed the ECM. In Step S409, the MTC UE 41 performs data communication in accordance with the ECM configuration information (ECM configuration-2) regarding the target cell 450 received via the source eNB 43 in Step S407 (M2M data with ECM).

FIG. 6 shows the example in which the handover request message and the acknowledgement message to the handover request are transmitted via a direct inter-eNB interface (i.e., X2 interface) provided between the source eNB 43 and the target eNB 45. However, the messages regarding the handover may be transmitted via interfaces (i.e., S1-MME interfaces) between the eNBs 43 and the EPC 44 (i.e., MME) and between the eNB 44 and the EPC 44. That is, the notification (from the source eNB 43 to the target eNB 45) indicating that the MTC UE 41 is executing the ECM and the ECM configuration (from the target eNB 45 to the source eNB 43) regarding the target cell 450 may be transmitted via the EPC 44.

Fifth Embodiment

In this embodiment, sharing of ECM support information between neighbouring eNBs is described. In this embodiment, an eNB 53 informs an eNB 55 whether a cell 530 of the eNB 53 is supporting the ECM (in other words, the coverage enhancement processing regarding the ECM). The eNB 55 is a base station that manages a neighbouring cell of the cell of the eNB 53. Further, the eNB 53 is informed by the eNB 55 whether a cell 550 of the eNB 55 is supporting the ECM (in other words, the coverage enhancement processing regarding the ECM). The information may indicate support of the ECM on a per-base-station basis (i.e., the ECM is supported in all the cells of the eNB 53 or 55) or on a per-cell basis (i.e., the ECM is supported in one or more of the cells of the eNB 53 or 55 and is not supported in the remaining cell(s)).

According to this embodiment, the following effects may be expected. If the serving eNB does not know whether or not a neighbouring eNB (neighbouring cell) is supporting the ECM, the serving eNB possibly cannot adequately determine whether or not the movement to the neighbouring cell by handover or cell-reselection is effective for the MTC UE, which is supporting the ECM or is executing the ECM. For example, in the case where the serving eNB (serving cell) is supporting the ECM but the neighbouring eNB (neighbouring cell) is not supporting the ECM, it may be better for the serving eNB not to allow the MTC UE, which is executing the ECM in the serving cell, to be handed over to the neighbouring cell in order to ensure communication characteristics of the MTC UE. On the other hand, in the case where the serving eNB (serving cell) is not supporting the ECM but the neighbouring eNB (neighbouring cell) is supporting the ECM, the serving eNB should probably allow the MTC UE that is supporting the ECM to move to the neighbouring cell by handover or cell reselection. In this embodiment, the eNB 53 can know whether the eNB 55 is supporting the ECM and the eNB 55 can know whether the eNB 53 is supporting the ECM. Therefore, the eNBs 53 and 55 can contribute to residing of the MTC UE 51 that is supporting the ECM in an appropriate cell or to communication of MTC UE 51 in an appropriate cell.

In the case where the cell 530 of the eNB 53 is not supporting the ECM but the cell 550 of the eNB 55 is supporting the ECM, for example, the eNB 53 may adjust a handover parameter(s) or a cell reselection parameter(s) to be sent to an MTC UE that is supporting the ECM so that the MTC UE can be easily moved to the neighbouring cell 550. It may be possible, for example, to increase a Cell Individual Offset (CIO) that acts on radio quality of the neighbouring cell 550. CIO is one of the handover parameters in the LTE and increase in CIO makes the transmission condition of a measurement report that triggers handover of the MTC UE 51 become easy to satisfy. Alternatively, Qoffset that acts on radio quality of the neighbouring cell 550 may be decreased. The Qoffset is one of the cell reselection parameters in the LTE and decrease in Qoffset makes the condition that the MTC UE 51 reselects the neighbouring cell 550 become easy to satisfy.

Figure 7:
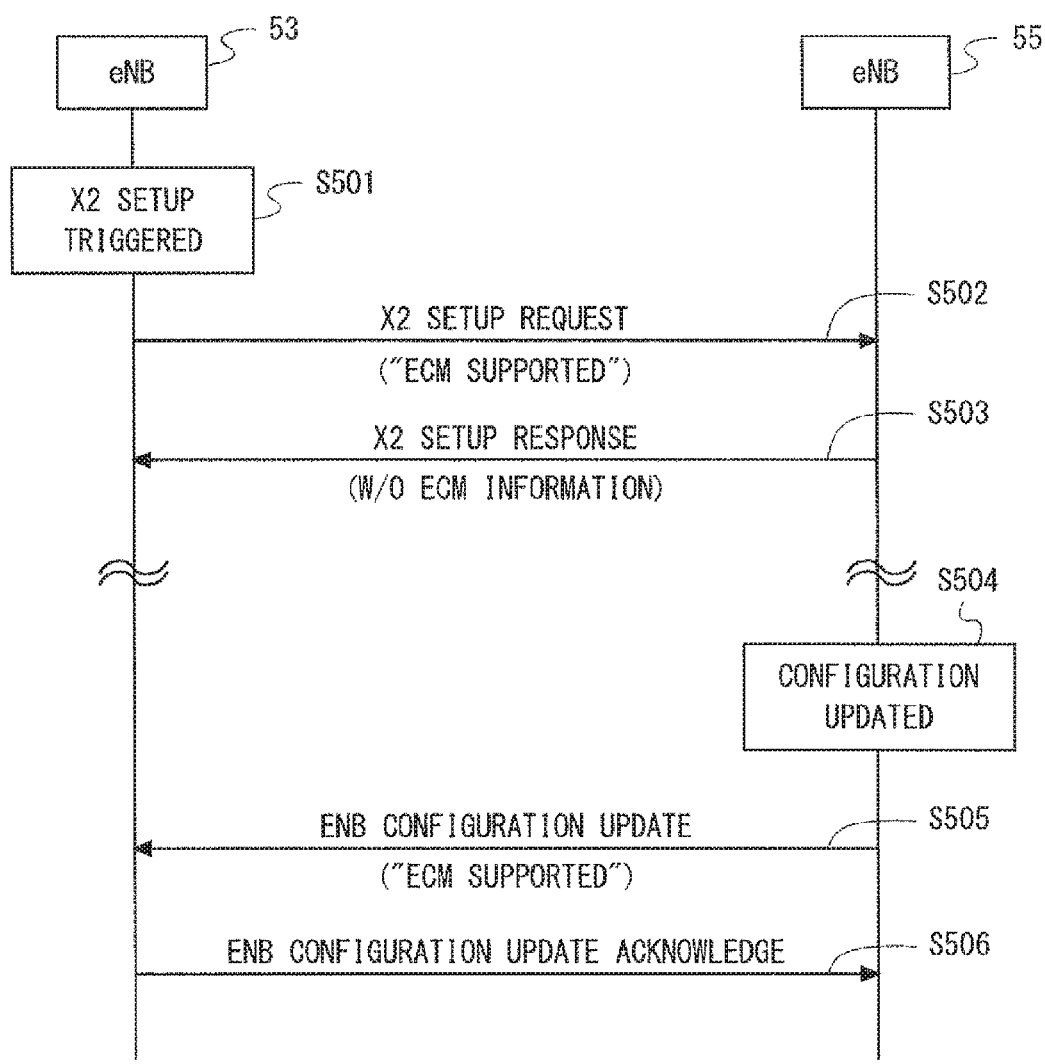
FIG. 7 is a sequence diagram showing one example of communication procedures according to a fifth embodiment.

FIG. 7 is a sequence diagram showing one example of operations of the eNB 53 and the eNB 55 according to this embodiment. FIG. 7 shows only the messages that are necessary for explanation of this embodiment and some messages included in the procedure specified in the LTE standard are not shown.

In Step S501, the eNB 53 is triggered to establish a direct interface (X2 interface) with the eNB 55 that manages the neighbouring (or surrounding) cell 550 of the cell 530 managed by the eNB 53 (X2 setup Triggered). In Step S502, the eNB 53 sends a request for establishing the X2 interface to the eNB 55 (X2 Setup Request). The message in Step S502 indicates whether the ECM is supported in the cell 530 of the eNB 53. In the example shown in FIG. 7, the eNB 53 sends information indicating that the ECM is supported (ECM supported). The information may indicate support of the ECM on a per-base-station basis (i.e., the ECM is supported in all the cells of the eNB 53) or on a per-cell basis (i.e., the ECM is supported in one or more of the cells of the eNB 53 and is not supported in the remaining cell(s)).

In Step S503, the eNB 55 sends a response message in response to the request for establishing the X2 interface received from the eNB 53 (X2 Setup Response). The response message in Step S503 indicates whether the ECM is supported in the cell 550 of the eNB 55. In the example shown in FIG. 7, the cell 550 does not support the ECM. Therefore, the response message in Step S503 does not contain information indicating that the ECM is supported. Alternatively, the response message in Step S503 may contain information explicitly indicating that the ECM is not supported.

After that, in Step S504, the configuration of the eNB 55 is updated and the eNB 55 begins supporting the ECM. Accordingly, in Step S505, the eNB 55 notifies the eNB 53 that the eNB configuration has been updated (ENB Configuration Update). The message in Step S505 contains information indicating that the ECM is supported in the cell 550 of the eNB 55 (ECM supported). The information may indicate support of the ECM on a per-base-station basis (i.e., the ECM is supported in all the cells of the eNB 55) or on a per-cell basis (i.e., the ECM is supported in one or more of the cells of the eNB 55 and is not supported in the remaining cell(s)). In Step S506, the eNB 53 sends a response message in response to the notification from the eNB 53 of the eNB configuration update (ENB Configuration Update Acknowledge).

Lastly, configuration examples of the MTC UEs, the eNBs, and the core network nodes (e.g., MME or HSS or both) according to the above embodiments are described below. Each of the MTC UEs 11, 21, 31, and 41 described in the first to fifth embodiments may include a transceiver to communicate with an eNB and a controller that is coupled to the transceiver. The controller executes the communication control regarding the ECM performed by the MTC UE 11, 21, 31, or 41 described in the first to fifth embodiments.

Each of the eNBs 13, 23, 33, 43, 45, 53, and 55 described in the first to fifth embodiments may include a transceiver to communicate with UEs including MTC UEs and a controller that is coupled to the transceiver. The controller executes the communication control regarding the ECM performed by the eNB 13, 23, 33, 43, 45, 53, or 55 described in the first to fifth embodiments.

Each of the core network nodes 141, 241, and 341 described in the first to fifth embodiments may include an interface to communicate with an eNB and a controller that is coupled to the interface. The controller executes the communication control regarding the ECM performed by the core network node 141, 241, or 341 described in the first to fifth embodiments.

Figure 8:
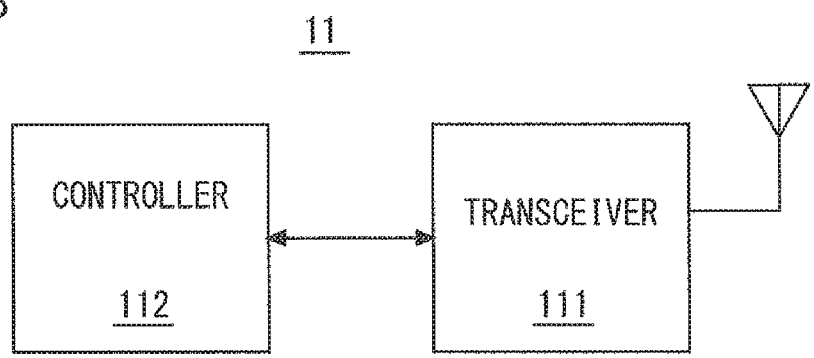
FIG. 8 is a block diagram showing a configuration example of an M2M terminal (MTC UE) according to the embodiments of the present invention.
Figure 9:
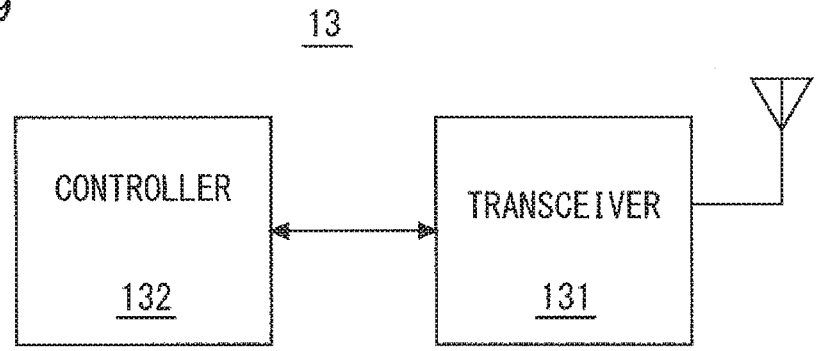
FIG. 9 is a block diagram showing a configuration example of a base station (eNB) according to the embodiments of the present invention.
Figure 10:
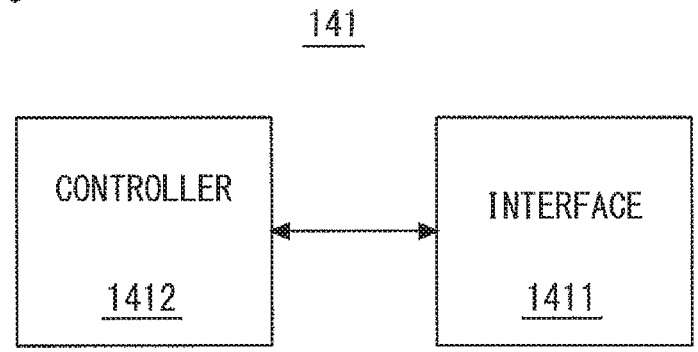
FIG. 10 is a block diagram showing a configuration example of a core network node according to the embodiments of the present invention.

FIGS. 8 to 10 are block diagrams respectively showing configuration examples of the MTC UE 11, the eNB 13, and the core network node 141 according to the first embodiment. Referring to FIG. 8, the MTC UE 11 includes a transceiver 111 and a controller 112. The transceiver 111 is configured to communicate with the eNB 13. The controller 112 is configured to control execution of the coverage enhancement processing regarding the ECM in the MTC UE 11 in accordance with instructions from the eNB 13.

Referring to FIG. 9, the eNB 13 includes a transceiver 131 and a controller 132. The transceiver 131 is configured to communicate with UEs including the MTC UEs 11 and the normal UE 12. The controller 132 is configured to control communication between the MTC UEs 1 and the eNB 13 using the coverage enhancement processing regarding the ECM. Specifically, the controller 132 receives from the EPC 14 the history information, which indicates whether the coverage enhancement processing (e.g., PDSCH/PUSCH repetition) regarding the ECM was executed in previous communication with each MTC UE (M2M terminal) 11. The controller 132 then controls communication between each MTC UE 11 and the eNB 13 using the coverage enhancement processing regarding the ECM based on the history information received from the EPC 14.

Referring to FIG. 10, the core network node 141 includes an interface 1411 and a controller 1412. The interface 1411 is used to send and receive signaling messages to and from the eNB 13. The controller 1412 is configured to send and receive signaling messages to and from the eNB 13 via the interface 1411. Specifically, the controller 1412 sends the history information, which indicates whether the specific coverage enhancement processing was executed in previous communication with each MTC UE 11, to the eNB 13 via the interface 1411 during a procedure for establishing an EPS bearer between each MTC UE 11 and the EPC 14.

The controllers included in the MTC UEs, the eNBs, and the core network nodes according to the above embodiments may be implemented by causing a computer including at least one processor (e.g., microprocessor, Micro Processing Unit (MPU), Central Processing Unit (CPU)) to execute a program. Specifically, one or more programs containing set of instructions that causes a computer to perform algorithms regarding the MTC UE, the eNB, or the core network node described using the sequence diagrams and the like may be supplied to the computer.

These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). These programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Other Embodiments

The explanations of the aforementioned embodiments have been provided with regard to the situation in which MTC UEs are configured with the special operation mode, i.e., the Enhanced Coverage Mode (ECM) and perform the coverage enhancement processing (e.g., RACH repetition and PDSCH/PUSCH repetition) regarding the ECM. However, the MTC UEs is only required to execute the special coverage enhancement processing (e.g., RACH repetition and PDSCH/PUSCH repetition) and do not have to be configured with the special operation mode (i.e., ECM). In other words, the MTC UEs 11, 21, 31, and 41 may execute the special coverage enhancement processing (e.g., RACH repetition and PDSCH/PUSCH repetition) in accordance with the radio resource configuration without setting the special operation mode such as the ECM or without receiving an instruction regarding the special operation mode.

The explanations of the above embodiments have been provided with regard to the ECM, however the technical ideas described in these embodiments may be applied to a case in which a radio network (e.g., eNB) causes M2M terminals (MTC UEs) to execute special processing other than the ECM.

Further, the terms "normal terminals (UE)" and "M2M terminals (MTC UEs)" used in the above explanation are also referred to as "user terminals" and "non-user terminals", respectively.

Further, in the above embodiments, the LTE system has been mainly described. However, these embodiments may be applied to radio communication systems other than the LTE system (e.g., 3GPP UMTS, 3GPP2 CDMA2000 system (1×RTT, HRPD), GSM/GPRS system, or WiMAX system).

When the aforementioned embodiments are applied to the 3GPP UMTS, the operations of the eNB (eNB 13, 23, 33, 43, 53, or 55) according to the embodiments may be performed by a NodeB, an RNC or the combination thereof. In other words, the term "base station" used in the specification and claims means one or more entities installed in a radio access network, for example, any one or combination of a NodeB or an RNC in the UMTS.

Further, the above embodiments are merely examples of applications of technical ideas obtained by the present inventor. Needless to say, these technical ideas are not limited to the above embodiments and the above embodiments may be modified in various ways.

For example, the whole or part of the embodiments disclosed above can be described as, but not limited to, the following supplementary notes.

(Supplementary Note 1)

A base station apparatus including:

radio communication means for communicating with an M2M terminal; and control means for controlling communication using specific coverage enhancement processing between the M2M terminal and the radio communication means based on at least one of: a terminal capability of the M2M terminal; terminal information of the M2M terminal; a communication characteristic of the M2M terminal; and radio quality of the M2M terminal, and further based on an access cause received from the M2M terminal.

(Supplementary Note 2)

The base station apparatus according to Supplementary Note 1, in which the controlling includes determining whether to execute the specific coverage enhancement processing in communication between the M2M terminal and the radio communication means.

(Supplementary Note 3)

The base station apparatus according to Supplementary Note 1 or 2, in which the controlling includes instructing the M2M terminal to execute the specific coverage enhancement processing.

(Supplementary Note 4)

The base station apparatus according to any one of Supplementary Notes 1 to 3, in which in response to receiving from the M2M terminal a notification indicating that the specific coverage enhancement processing is being executed in the M2M terminal, the control means further controls communication using the specific coverage enhancement processing between the M2M terminal and the radio communication means based on the notification.

(Supplementary Note 5)

The base station apparatus according to Supplementary Note 4, in which the notification is transmitted to the base station apparatus from the M2M terminal when establishing a radio connection with the M2M terminal or while performing a procedure for establishing a bearer between the M2M terminal and a core network.

(Supplementary Note 6)

The base station apparatus according to any one of Supplementary Notes 1 to 5, in which the terminal capability includes at least one of a radio access capability, a device capability, and a terminal category (UE category).

(Supplementary Note 7)

The base station apparatus according to any one of Supplementary Notes 1 to 6, in which the terminal information includes at least one of a terminal type (UE type), a device type, and a terminal context (UE context).

(Supplementary Note 8)

The base station apparatus according to Supplementary Note 7, in which the terminal context includes at least one of: information regarding the terminal capability; Radio Resource Control connection information configured in the M2M terminal; information regarding mobility of the M2M terminal; and history information indicating whether or not the specific coverage enhancement processing was executed in previous communication of the M2M terminal.

(Supplementary Note 9)

The base station apparatus according to any one of Supplementary Notes 1 to 8, in which the control means notifies a neighbouring base station that the M2M terminal is executing the specific coverage enhancement processing when the M2M terminal is handed over from a cell of the base station apparatus to a neighbouring cell.

(Supplementary Note 10)

The base station apparatus according to any one of Supplementary Notes 1 to 9, in which the control means informs a neighbouring base station whether the specific coverage enhancement processing is supported by the base station apparatus and the control means is informed by the neighbouring base station whether the specific coverage enhancement processing is supported by the neighbouring base station.

(Supplementary Note 11)

A Machine-to-machine (M2M) terminal that performs M2M communication, including:

radio communication means for communicating with a base station; and control means, in which the base station is configured to control communication using specific coverage enhancement processing between the M2M terminal and the base station based on at least one of: a terminal capability of the M2M terminal; terminal information of the M2M terminal; a communication characteristic of the M2M terminal; and radio quality of the M2M terminal, and further based on an access cause received from the M2M terminal, and the control means transmits the access cause to the base station via the radio communication means and receives an instruction to execute the specific coverage enhancement processing from the base station.

(Supplementary Note 12)

The M2M terminal according to Supplementary Note 11, in which, in response to receiving the instruction to execute the specific coverage enhancement processing, the control means continues executing the specific coverage enhancement processing until having received an instruction to stop the specific coverage enhancement processing.

(Supplementary Note 13)

The M2M terminal according to Supplementary Note 11, in which, in response to receiving the instruction to execute the specific coverage enhancement processing, the control means continues executing the specific coverage enhancement processing even after releasing a radio connection with the base station.

(Supplementary Note 14)

The M2M terminal according to Supplementary Note 11, in which, in response to receiving the instruction to execute the specific coverage enhancement processing, the control means continues executing the specific coverage enhancement processing even while repeating establishment and release of a radio connection with the base station.

(Supplementary Note 15)

The M2M terminal according to any one of Supplementary Notes 12 to 14, in which the control means transmits to the base station a notification indicating whether the specific coverage enhancement processing is being executed in the M2M terminal when establishing a radio connection with the base station.

(Supplementary Note 16)

A method performed by a base station, including:

controlling communication using specific coverage enhancement processing between an M2M terminal and the base station based on at least one of: a terminal capability of an M2M terminal; terminal information of the M2M terminal; a communication characteristic of the M2M terminal; and radio quality of the M2M terminal, and further based on an access cause received from the M2M terminal.

(Supplementary Note 17)

A method performed by a Machine-to-machine (M2M) terminal that performs M2M communication via a base station, in which the base station is configured to control communication using specific coverage enhancement processing between the M2M terminal and the base station based on at least one of: a terminal capability of the M2M terminal; terminal information of the M2M terminal; a communication characteristic of the M2M terminal; and radio quality of the M2M terminal; and further based on an access cause received from the M2M terminal, and the method includes:

transmitting the access cause to the base station; and receiving an instruction to execute the specific coverage enhancement processing from the base station.

(Supplementary Note 18)

A program for causing a computer to execute a method regarding a base station, in which the method includes controlling communication using specific coverage enhancement processing between an M2M terminal and the base station based on at least one of: a terminal capability of the M2M terminal; terminal information of the M2M terminal; a communication characteristic of the M2M terminal; and radio quality of the M2M terminal, and further based on an access cause received from the M2M terminal.

(Supplementary Note 19)

A program for causing a computer to execute a method regarding a Machine-to-machine (M2M) terminal that performs M2M communication via a base station, in which the base station is configured to control communication using specific coverage enhancement processing between the M2M terminal and the base station based on at least one of: a terminal capability of the M2M terminal; terminal information of the M2M terminal; a communication characteristic of the M2M terminal; and radio quality of the M2M terminal, and further based on an access cause received from the M2M terminal, and the method includes:

transmitting the access cause to the base station; and receiving an instruction to execute the specific coverage enhancement processing from the base station.

This application is based upon and claims the benefit of priority from Japanese Patent Application No. 2014-015868, filed on Jan. 30, 2014, the disclosure of which is incorporated herein in its entirety by reference.

REFERENCE SIGNS LIST 11, 21, 31, 41 M2M TERMINAL (MTC UE)
12 RADIO TERMINAL (UE)
13, 23, 33, 43, 45, 53, 55 BASE STATION (eNB)
14, 44 CORE NETWORK (EPC)
130, 430, 450 CELL
111 TRANSCEIVER
112 CONTROLLER
131 TRANSCEIVER
132 CONTROLLER
141, 241, 341 CORE NETWORK NODE
1411 INTERFACE
1412 CONTROLLER

The invention claimed is:

1. An eNodeB comprising:
a transceiver configured to communicate with a User Equipment (UE) capable of receiving a paging massage with repetition for coverage enhancement;
an S1 interface configured to be connected with a Mobility Management Entity (MME); and
a processor configured to support transmission of the paging message with repetition for the coverage enhancement, wherein the processor is configured to:
send an S1 message for UE Context Release to the MME via the S1 interface, the S1 message including coverage enhancement information, send UE radio capability information to the MME via the S1 interface, and receive, from the MME via the S1 interface, the UE radio capability information, the coverage enhancement information, and a cell global identity used for the paging, wherein the UE radio capability information includes at least one of UE category information and coverage enhancement mode information, which indicates whether the UE supports a coverage enhancement mode.

2. The eNodeB according to claim 1, wherein the coverage enhancement information indicates whether the coverage enhancement was executed for the UE.

3. The eNodeB according to claim 1, wherein
the UE radio capability information includes at least the UE category information, and
the UE category information indicates a category for a Machine Type Communication (MTC) UE.

4. The eNodeB according to claim 3, wherein the coverage enhancement information is used by the MME.

5. A Mobile Management Entity (MME) comprising:
a memory;
a processor configured to manage a mobility of a User Equipment (UE) capable of receiving a paging massage with repetition for coverage enhancement; and
an S1 interface configured to be connected with an eNodeB supporting transmission of the paging message with repetition for coverage enhancement, wherein the processor configured to:
receive an S1 message for UE Context Release from the eNodeB via the S1 interface, the S1 message including coverage enhancement information,
store the coverage enhancement information into the memory upon reception of the coverage enhancement information,
receive, from the eNodeB via the S1 interface, UE radio capability information, and
send, to the eNodeB via the S1 interface, the UE radio capability information, the coverage enhancement information and a cell global identity for sending the paging message, wherein
the UE radio capability information includes at least one of UE category information and coverage enhancement mode information, which indicates whether the UE supports a coverage enhancement mode.

6. The MME according to claim 5, wherein the coverage enhancement information indicates whether the coverage enhancement was executed for the UE.

7. The MME according to claim 5, wherein
the UE radio capability information includes at least the UE category information, and
the UE category information indicates a category for a Machine Type Communication (MTC) UE.

8. The MME according to claim 7, wherein the coverage enhancement information is used by the MME for paging to the UE in a Radio Resource Control (RRC) IDLE state.

9. A method of an eNodeB, the method comprising:
communicating with a User Equipment (UE) capable of receiving a paging massage with repetition for coverage enhancement;
supporting transmission of the paging message with repetition for the coverage enhancement;
sending an S1 message for UE Context Release to a Mobility Management Entity (MME) via an S1 interface, the S1 message including coverage enhancement information;
sending UE radio capability information to the MME via the S1 interface; and
receiving, from the MME via the S1 interface, the UE radio capability information, the coverage enhancement information and a cell global identity used for the paging, wherein
the UE radio capability information includes at least one of UE category information and coverage enhancement mode information, which indicates whether the UE supports a coverage enhancement mode.

10. A method of a Mobile Management Entity (MME), the method comprising:
managing a mobility of a User Equipment (UE) capable of receiving a paging massage with repetition for coverage enhancement;
receiving, via an S1 interface, an S1 message for UE Context Release from an eNodeB supporting transmission of the paging message with repetition for coverage enhancement, the S1 message including coverage enhancement information;
storing the coverage enhancement information into a memory upon reception of the coverage enhancement information;
receiving, from the eNodeB via the S1 interface, UE radio capability information; and
sending, to the eNodeB via the S1 interface, the UE radio capability information, the coverage enhancement information and a cell global identity for sending the paging message, wherein
the UE radio capability information includes at least one of UE category information and coverage enhancement mode information, which indicates whether the UE supports a coverage enhancement mode.

* * * * *